US009451165B2

(12) United States Patent
Okuhira et al.

(10) Patent No.: US 9,451,165 B2
(45) Date of Patent: Sep. 20, 2016

(54) IMAGE PROCESSING APPARATUS

(71) Applicant: Hitachi Kokusai Electric Inc., Tokyo (JP)

(72) Inventors: Masatoshi Okuhira, Tokyo (JP); Haruhiro Koto, Tokyo (JP)

(73) Assignee: HITACHI KOKUSAI ELECTRIC INC. (JP)

( * ) Notice: Subject to any disclaimer, the term of this patent is extended or adjusted under 35 U.S.C. 154(b) by 0 days.

(21) Appl. No.: 14/767,708

(22) PCT Filed: Feb. 12, 2014

(86) PCT No.: PCT/JP2014/053167
§ 371 (c)(1),
(2) Date: Aug. 13, 2015

(87) PCT Pub. No.: WO2014/126093
PCT Pub. Date: Aug. 21, 2014

(65) Prior Publication Data
US 2015/0358547 A1    Dec. 10, 2015

(30) Foreign Application Priority Data

Feb. 14, 2013 (JP) ................................ 2013-026250

(51) Int. Cl.
*H04N 5/228* (2006.01)
*G06K 9/40* (2006.01)
*H04N 5/232* (2006.01)
*G06T 5/00* (2006.01)
*G06T 5/20* (2006.01)
*G06K 9/00* (2006.01)
*G06T 5/40* (2006.01)
*G06K 9/62* (2006.01)
*G06T 5/50* (2006.01)
*H04N 5/217* (2011.01)

(52) U.S. Cl.
CPC ...... *H04N 5/23277* (2013.01); *G06K 9/00536* (2013.01); *G06K 9/40* (2013.01); *G06K 9/6212* (2013.01); *G06T 5/002* (2013.01); *G06T 5/20* (2013.01); *G06T 5/40* (2013.01); *G06T 5/50* (2013.01); *H04N 5/217* (2013.01); *G06T 2207/10016* (2013.01); *G06T 2207/20182* (2013.01)

(58) Field of Classification Search
CPC .................... H04N 5/23248; H04N 5/23264; H04N 5/23267; G03B 2207/005; G06T 7/2033; G06T 7/204; G06T 7/2046; G06T 2207/20204; G06T 7/20; G06K 9/40
USPC ................ 348/222.1, 208.99, 208.4, 208.13; 382/107, 274, 275
See application file for complete search history.

(56) References Cited

U.S. PATENT DOCUMENTS

2005/0105610 A1\* 5/2005 Sung .......................... G06T 5/50
375/240.01
2009/0185078 A1\* 7/2009 Van Beek ............. G06T 3/4007
348/624

(Continued)

*Primary Examiner* — Kelly L Jerabek
(74) *Attorney, Agent, or Firm* — Bacon & Thomas, PLLC

(57) ABSTRACT

An image processing apparatus includes an imaging unit which outputs an imaging result as a time-series image and an image correction unit, to which the time-series image outputted from the imaging unit is inputted as an input image, for correcting image fluctuation in the input image. The image correction unit includes a temporally-smoothed image generation section which generates a temporally-smoothed image by smoothing time-series input images, a similarity determination section which sets a local area for the temporally-smoothed image and determines similarities between the local area and partial areas of the time-series input images; and a corrected image generation section which selects a partial area having the highest similarity to the local area, and generates a corrected image based on the selected partial area.

12 Claims, 19 Drawing Sheets

(56) References Cited

U.S. PATENT DOCUMENTS

| | | | |
|---|---|---|---|
| 2011/0085049 A1* | 4/2011 | Dolgin | H04N 5/23248 348/208.4 |
| 2011/0235941 A1* | 9/2011 | Hamada | H04N 5/21 382/275 |
| 2013/0329064 A1* | 12/2013 | Price | H04N 19/132 348/208.6 |
| 2015/0161773 A1* | 6/2015 | Takahashi | H04N 5/2171 382/173 |
| 2015/0228085 A1* | 8/2015 | Komiya | G06T 7/20 382/107 |

* cited by examiner

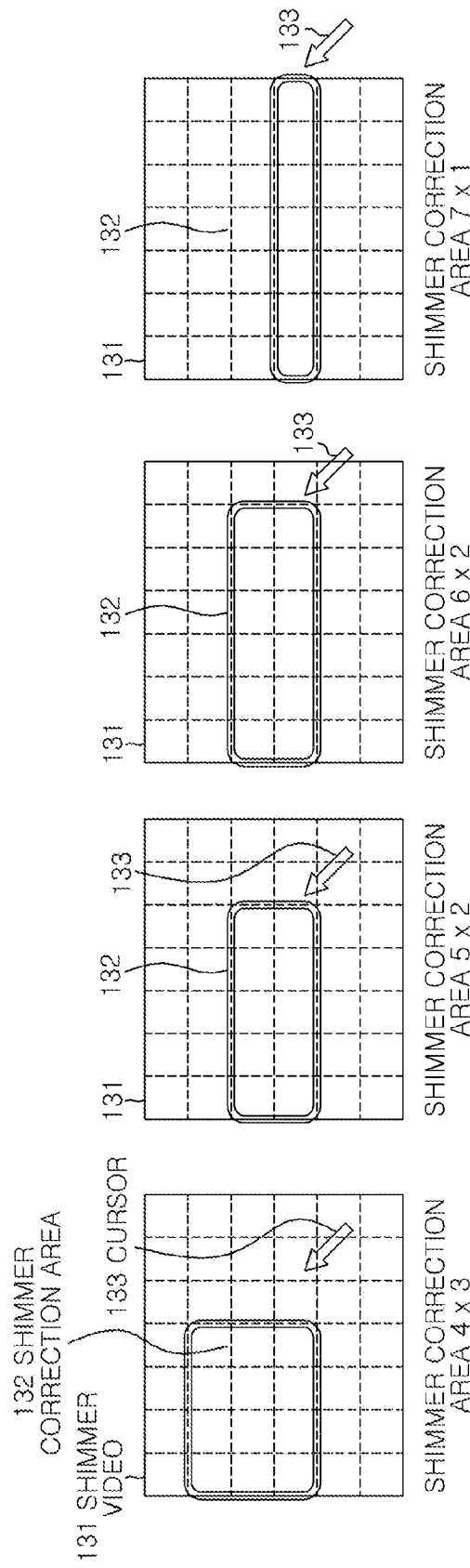

IMAGE PROCESSING APPARATUS

FIELD OF THE INVENTION

The present invention relates to an image processing technique for improving image quality by preventing deterioration of image quality due to shimmering or the like.

BACKGROUND OF THE INVENTION

Various image processing techniques, such as super-resolution processing for improving the resolution of captured images, haze removal processing for improving the visibility by removing hazes included in the images, and so on, have been introduced into the recent cameras. In particular, Patent Document 1 and Patent Document 2 disclose image processing techniques relating the present invention. These Patent Documents are common in that an image is reconstructed by filtering (averaging) an input image in a time domain. Patent Document 1 is to obtain and correct a deviation (motion vector) of the input image by referring to the reconstructed image (motion vectors) and Patent Document 2 is to output the reconstructed image as it is output.

Here, the technique of Patent Document 1 (Prior art 1) will be described in brief with reference to FIGS. 16 to 18.

In the technique of Patent Document, image processing is performed in the sequence shown in FIG. 16. Specifically, a reference image is first estimated (S51). Next, an optical flow (motion vector) is calculated (S52). Finally, motion correction is performed (S53).

The estimation of the reference image in S51 is performed by exponential moving average of an input image. Since the exponential moving average has the effect of reducing high frequency components of time-series input images, the estimated reference image becomes an image having no motion as a moving body, fluctuation due to shimmer and so on are removed from the reference image, Next, in the calculation of the optical flow in S52, as shown in FIG. 17, a motion vector of a local area (for example, 5 vertical pixels and 5 horizontal pixels) of the input image is estimated by block matching (BM) between the input image and the reference image. This motion vector is taken as a motion vector of the center point (pixel of interest) of the local area. In the example of FIG. 17, for example, the direction and amount of movement (from a position of the corresponding reference image) of a local area 1 (5 vertical pixels and 5 horizontal pixels) of an input image 172 similar to a local area of a reference image 171 (i.e., taking BM) are represented as a motion vector 1 of the center point (pixel 1 of interest) of the local area 1.

In the motion correction in S53, as shown in FIG. 18, local areas 1 to 3 of the input image are shifted according to the estimated motion vector and are overlapped each other. In this way, a corrected image is generated by the overlap of partial images.

RELATED TECHNICAL DOCUMENT

Patent Document

Patent Document 1: JP 2012-104018 A
Patent Document 2: JP 2011-229030 A

According to the techniques of Patent Documents 1 and 2, even when an image captured by a camera is deteriorated due to shimmer or the like, it is possible to obtain an image with good quality by correcting effects of shimmer or the like.

However, in the case of the correction by the technique of Patent Document 1, since a spatial position of the input image at a certain time overlaps with a different local area to generate a corrected image at that time, there is a problem that a sense of resolution of the corrected image is deteriorated due to a smoothing effect of the overlapping.

In addition, since the input image is distorted due to shimmer or the like, its local area is also distorted. Therefore, when this distorted local area is searched in the input image, since a wrong area may be detected as an area with high similarity, a corrected image generated by overlapping them may be distorted, thereby causing a problem of deterioration of image quality.

To overcome the above problems, it is an object of the present invention to provide an image processing apparatus which is capable of improving image quality by correcting an effect of shimmer or the like while suppressing reduction of a sense of resolution and deterioration of image quality due to image distortion, which are caused in conventional image processing. Hereinafter, in some cases, fluctuation of an image including shimmer may be represented by "shimmer." While this technique is remarkably exhibited in the description of the configuration and operation of the apparatus, this technique is generally applied to fluctuation of images.

SUMMARY OF THE INVENTION

To accomplish the above object, the representative configuration of the image processing apparatus according to the present invention is as follows.

Advantages of the Invention

According to the above configuration, it is possible to improve image quality by correcting an effect of shimmer or the like while maintaining a sense of resolution and suppressing reduction of a sense of resolution and distortion of an image, which are caused in the prior art 1.

BRIEF DESCRIPTION OF THE DRAWINGS

FIGS. 13A to 13D are views for explaining a shimmer correction area according to the third example of the embodiment of the present invention.

DETAILED DESCRIPTION OF THE EMBODIMENTS

Hereinafter, an image processing apparatus in an embodiment of the present invention will be described. In this embodiment, a description is given of an image processing apparatus for correcting a fluctuation of an image due to shimmer.

Figure 1:
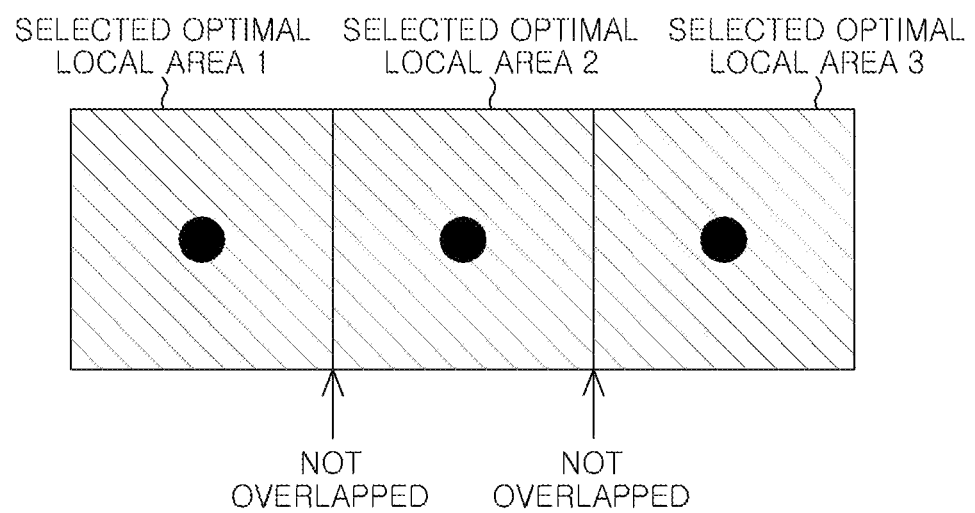
FIG. 1 is a view for explaining generation of a corrected image according to an embodiment of the present invention.

The image processing apparatus of the this embodiment generates a temporally-smoothed image, which is obtained by smoothing a chronologically added input image, and estimates the similarity in a local area between the input image and the temporally-smoothed image by BM (Block Matching) using SAD (Sum of Absolute Difference) or the like. In this case, in addition to the input image at a certain time, input images at plural times before and after the certain time are used to calculate similarity with the temporally-smoothed image in order to detect local areas of the input images having the highest similarity. This process is performed for all or some of the area of the temporally-smoothed image. As shown in FIG. 1, an image generated by combining the detected local areas (in a non-overlapping manner) is taken as a corrected image. This process can prevent deterioration of a sense of resolution. FIG. 1 is a view for explaining generation of a corrected image according to an embodiment of the present invention. As shown in FIG. 1, optimal local areas 1 to 3, which are local areas having the highest similarity, are selected from input images at plural times to generate the corrected image.

The above image processing is based on the property that image fluctuation due to shimmer is symmetrical with respect to a correct position that would have been originally displayed if there is no fluctuation. Hereinafter, this displayed position is called an average position. Also, an image to be corrected (which may be often an edge (portion) of an object) is called a target image. Then, a case where the local area of the input image at a certain time is far from the average position of the fluctuating image is considered. By using a plurality of time-series images, the possibility of capturing a local area having an image close to the average position of the image fluctuating due to shimmer, i.e., the correct position of the image, is increased, which can result in improvement of the quality of the corrected image.

Figure 2A:
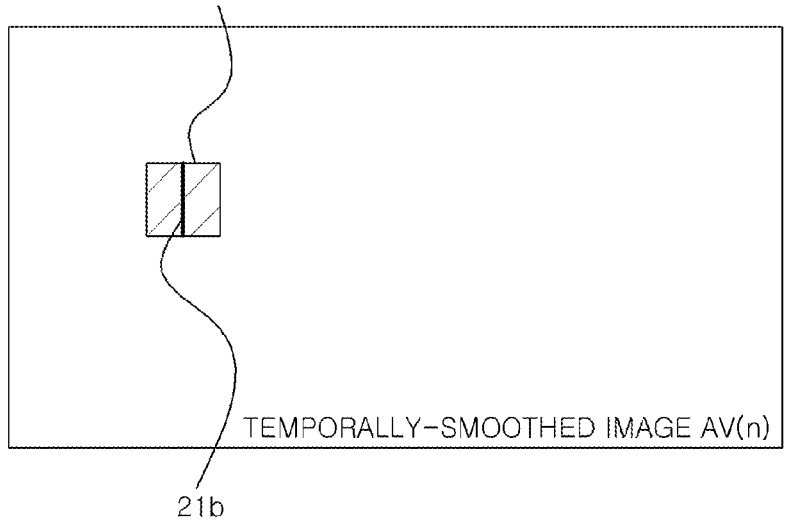
FIGS. 2A to 2C are views for explaining calculation of similarity according to a comparative example of the embodiment of the present invention.
Figure 2B:
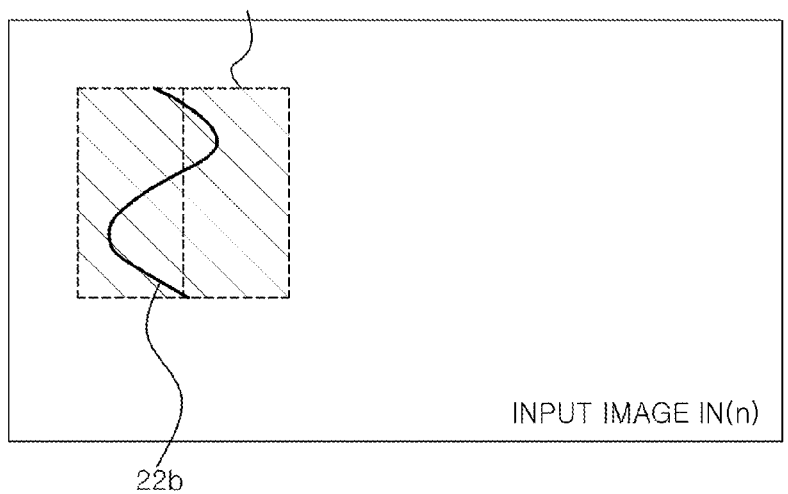
Figure 2C:
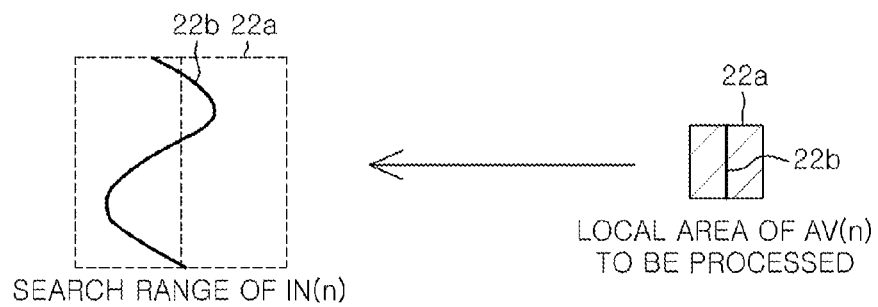

FIGS. 2A to 2C are views for explaining calculation of similarity according to a comparative example of the embodiment of the present invention, showing a case where only an input image IN(n) at a certain time is used to calculate similarity. FIG. 2A shows a temporally-smoothed image AV(n). In FIG. 2A, reference numeral 21a denotes a local area to be processed and reference numeral 21b denotes a target image. As shown, a fluctuating line is corrected to the correct position, which would have been originally displayed, by the time smoothing. FIG. 2B shows an input image IN(n). In FIG. 2B, reference numeral 22a denotes a range within which an image area similar to the local area 21a to be processed is searched and reference numeral 22b denotes a target image. As shown, a line is distorted by fluctuation.

As shown in FIG. 2C, the target image 22b of the input image IN(n) is far from the average position of the target image 22b since it fluctuates by shimmer. Therefore, when performing similarity calculation between one input image IN(n) and the local area (to be processed) of the temporally-smoothed image AV(n), since there is no area having high similarity to be detected originally, other wrong area having similarity increased by chance is selected, which results in deterioration of the image quality of the corrected image generated from the selected partial image.

Figure 3A:
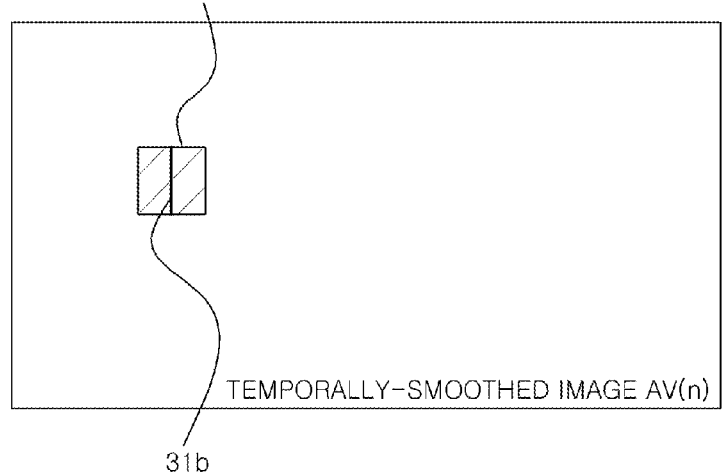
FIGS. 3A to 3C are views for explaining calculation of similarity according to the embodiment of the present invention.
Figure 3B:
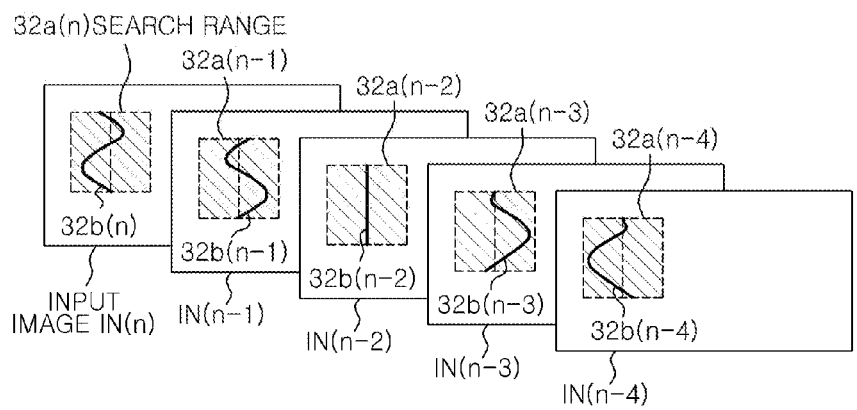
Figure 3C:
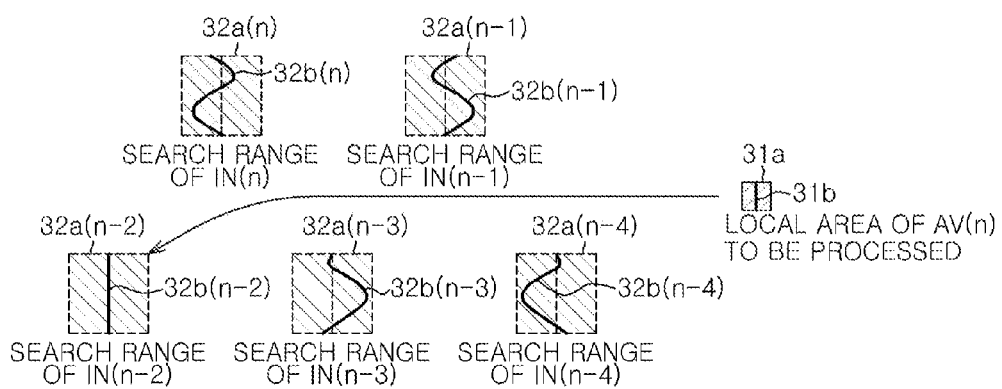

FIGS. 3A to 3C are views for explaining calculation of similarity according to this embodiment. FIG. 3A shows a temporally-smoothed image AV(n). In FIG. 3A, reference numeral 31a denotes a local area to be processed and reference numeral 31b denotes a target image. FIG. 3B shows a plurality of input images IN(n) to IN(n-4). In FIG. 3B, reference numerals 32a(n) to 32a(n-4) denote ranges within which an image area similar to the local area 31a to be processed is searched and reference numerals 32b(n) to 32b(n-4) denote target images. Due to the time difference between the input images, the correct position that would have been originally displayed fluctuates to the left and right. FIGS. 3A to 3C show a case of performing similarity calculation using the input image IN(n) at a certain time and further the input images IN(n-1) to IN(n-4) at plural times before the certain time.

As shown in FIG. 3C, although the target image 32b(n) of the input image IN(n) at the certain time is far from the average position of the target image 32b(n) since it fluctuates due to shimmer, since the fluctuation has the property that it is symmetrical with respect to the average position, the target image 32b(n-2) in the input image IN(n-2) at a different time is closer to the average position. Therefore, when performing similarity calculation between the plurality of input images IN(n) to IN(n-4) at different times and the local area (to be processed) of the temporally-smoothed image AV(n), an area of the input image IN(n-2) having higher similarity is selected, which results in improvement of the image quality of the corrected image generated from the image of the selected area (partial image).

In addition, in the description of FIGS. 2 and 3, by setting a search range in consideration of the range fluctuating by shimmer, the processing amount of the similarity calculation is reduced. The range fluctuating by shimmer may be estimated from a motion vector of a local area, which is estimated with the similarity calculation, or may be a constant or a variable.

Furthermore, in the above description, although local areas determined to have the highest similarity by the similarity calculation among the local areas of the plurality of input images is used for the corrected image, for example, local areas of the plurality of time-series input images in the ascending order of similarity may be smoothed to the extent that a sense of resolution is not lost. Thus, while minimizing degradation of the sense of resolution by smoothing only (similar) images having high similarity, it is possible to smooth a boundary between local areas of the generated corrected images, i.e., make seams of the corrected images generated from the plurality of local areas inconspicuous. Furthermore, using the input images IN(n−2), IN(n−1), IN(n), IN(n+1) and IN(n+2) and the target images 32b(n−2), 32b(n−1), 32(n), 32b(n+1) and 32b(n+2), the temporally-smoothed image AV(n) may be corrected with the total of five pairs of input images and target images at two times before and after AV(n).

FIRST EXAMPLE

Figure 4:
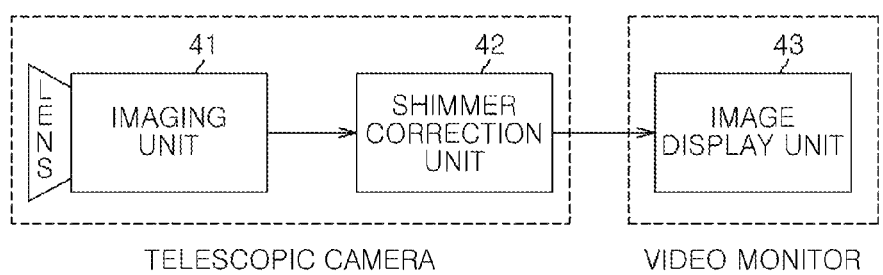
FIG. 4 is a view showing the configuration of an image processing apparatus according to a first example of the embodiment of the present invention.

FIG. 4 is a view showing the configuration of an image processing apparatus according to a first example of this embodiment. The image processing apparatus according to the first example is an example in which the present invention is applied to a telescopic camera surveillance system. As shown in FIG. 4, the telescopic camera surveillance system includes a telescopic camera and a video monitor. The telescopic camera includes an imaging unit 41 which includes a lens and outputs an imaging result as time-series images, and a shimmer correction unit 42 as an image correction unit which is input with the time-series images output from the imaging unit 41 as an input image and corrects fluctuation of the input image. The shimmer correction unit 42 corrects an effect of the fluctuation of the image output from the imaging unit 41 and outputs the corrected image to an image display unit 43. In the telescopic camera surveillance system, the direction of the camera to an imaging object is fixed at least for a predetermined time. That is, the image output from the imaging unit 41 is an image at the same position at least for a predetermined time. Or, the direction and position of the camera are moved to track a moving imaging object and display an image of the imaging object at a certain position on the image display unit 43.

Figure 5:
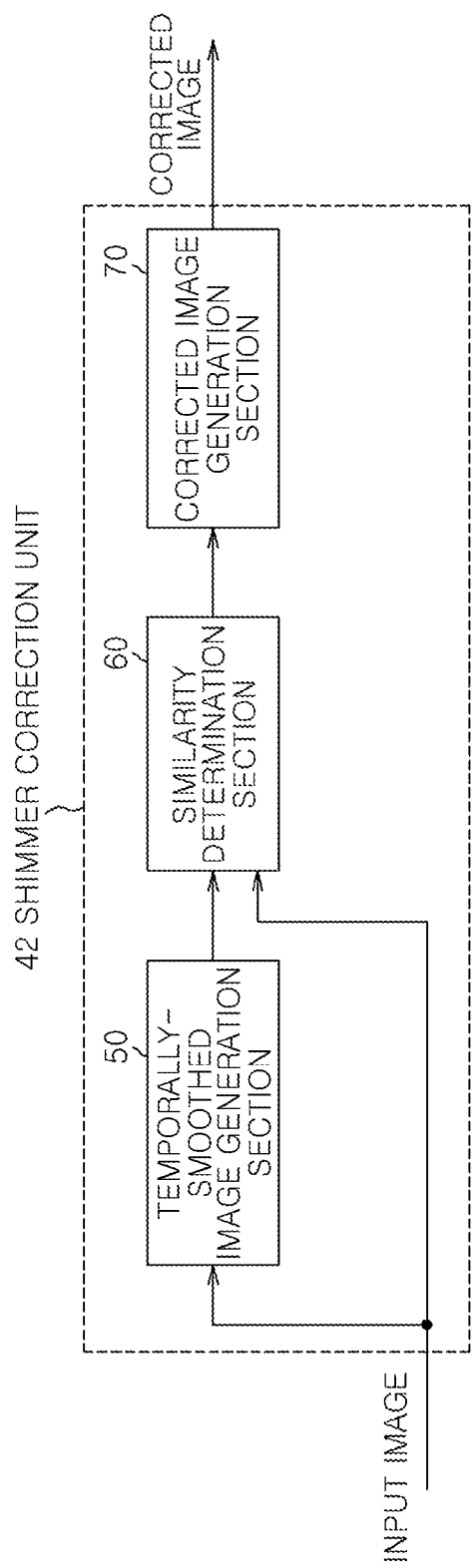
FIG. 5 is a view showing the configuration of a shimmer correction unit according to the first example of the embodiment of the present invention.

FIG. 5 is a functional block diagram showing the configuration of the shimmer correction unit 42 according to the first example. The shimmer correction unit 42 includes a temporally-smoothed image generation section 50, a similarity determination section 60 and a corrected image generation section 70.

The temporally-smoothed image generation section 50 generates a temporally-smoothed image by smoothing a plurality of time-series input images input sequentially from the imaging unit 41. Examples of a smoothing method may include exponential moving average, weighted moving average, simple moving average and the like. The temporally-smoothed image generated in the temporally-smoothed image generation section 50 and the time-series input images from the imaging unit 41 are input to the similarity determination section 60.

The similarity determination section 60 sets a local area for the temporally-smoothed image generated in the temporally-smoothed image generation section 50 and determines similarity between the temporally-smoothed image in the local area and a partial area of the plurality of time-series input images. At this time, the similarity determination section 60 calculates and determines the similarity between the temporally-smoothed image and the local area to be processed within a search range set for each of the plurality of time-series input images.

The corrected image generation section 70 selects a partial area (local area), which is optimal to shimmer correction, from the plurality of input images, based on a similarity calculation result output from the similarity determination section 60. The corrected image generation section 70 performs this process for all or some of the areas of the temporally-smoothed image, generates images of the selected partial areas (partial images) in combination (in a non-overlapping manner), and outputs the generated images as corrected images. In this manner, based on the similarity determination result calculated in the similarity determination section 60, the corrected image generation section 70 selects a partial area of the input images, which has an image similar to the image of the local area of the temporally-smoothed image, from the partial areas of the plurality of time-series input images, and generates the corrected image based on the selected partial area.

Hereinafter, each block in the shimmer correction unit 42 will be described in more detail.

Figure 6:
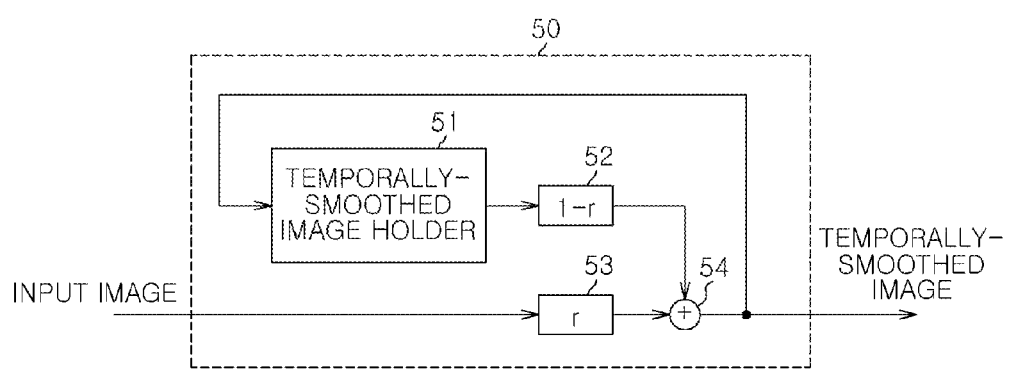
FIG. 6 is a view showing the configuration of a temporally-smoothed image generation section according to the first example of the embodiment of the present invention.

FIG. 6 is a view showing the configuration of the temporally-smoothed image generation section 50 according to the first example. The temporally-smoothed image generation section 50 includes a temporally-smoothed image holder 51, a multiplier 52, a multiplier 53 and an adder 54. The temporally-smoothed image generation section 50 in the example of FIG. 6 generates an image from which fluctuation due to shimmer is removed by smoothing the time-series images input sequentially from the imaging unit 41 using the exponential moving average.

The smoothing process by the exponential moving average is expressed by the following equation 1.

$$AV(n)=r \times N(n)+(1-r) \times V(n-1) \quad \text{(Equation 1)}$$

In this smoothing process, each pixel value of the input image IN(n) at a certain time is multiplied by r in the multiplier 53 and the temporally-smoothed image AV(n−1) right previous in the time-series order, which is held in the temporally-smoothed image holder 51, is multiplied by (1−r) in the multiplier 52. These outputs from the multipliers 52 and 53 are added in the adder 54. Then, an output from the adder 54 is output, as a new temporally-smoothed image AV(n), to the subsequent stage and updates the image of the temporally-smoothed image holder 51. In Equation 1, AV(n) represents an $n^{th}$ temporally-smoothed image and IN(n) represents an $n^{th}$ input image. In this case, the temporally-smoothed image generation section 50 is an infinite impulse response (IIR) filter.

Figure 7:
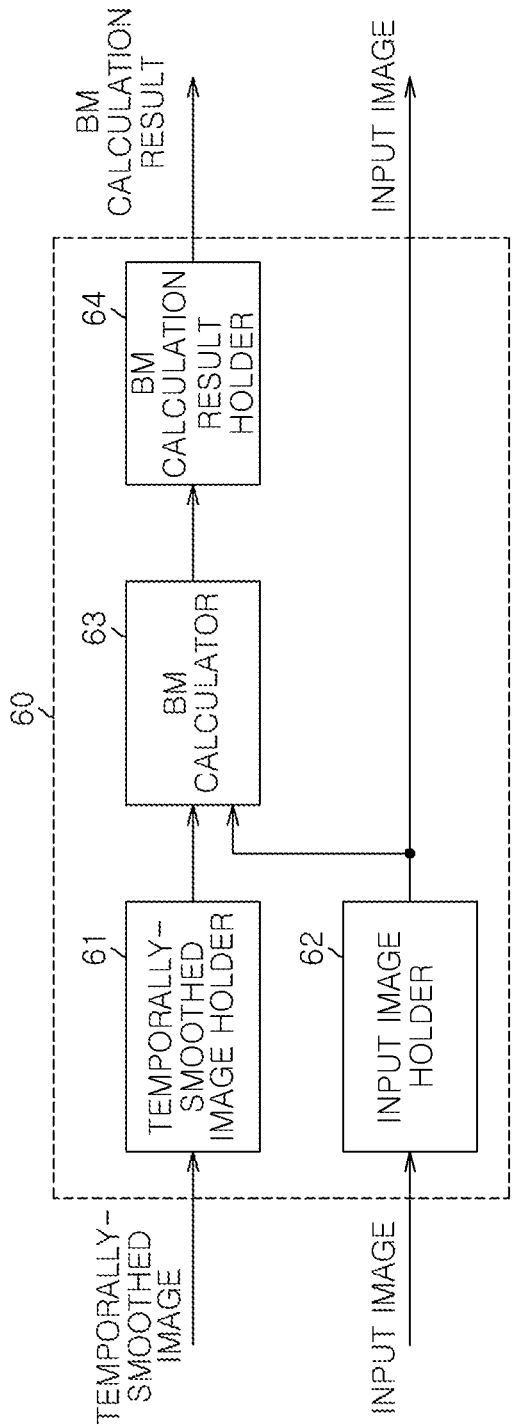
FIG. 7 is a view showing the configuration of a similarity determination section according to the first example of the embodiment of the present invention.

FIG. 7 is a view showing the configuration of the similarity determination section 60 according to the first example. The similarity determination section 60 includes a temporally-smoothed image holder 61, an input image holder 62, a BM calculator 63 as a similarity calculator, and a BM calculation result holder 64 as a similarity calculation result holder. The temporally-smoothed image holder 61 holds the temporally-smoothed image output from the temporally-smoothed image generation section 50. The input image holder 62 holds time-series input images (image frame) input in order from the imaging unit 41. The BM calculator 63 divides the temporally-smoothed image into local areas in the unit of N×N pixels and performs similarity calculation within a preset search range for each of the plurality of time-series input images held in the input image holder 62 for each of the local areas. This search range is set by the BM calculator 63 such that search range includes the local areas and is wider than the local areas. In this way, the similarity determination section 60 sets the search range for searching partial areas in the input images and determines the similarity between the temporally-smoothed image and the input images in the local areas within the search range. Thus, based on the local areas as the temporally-smoothed image, the corrected image generation section 70 can search partial images similar to the local areas from the time-series input images. For example, SAD can be used for estimation of the similarity of the local areas to be processed.

Results of the calculation of the BM calculator 63 are held in the BM calculation result holder 64, for example in association of an input image number obtained the least SAD value, a position in the input image, and its SAD value, for each local area. For example, for a local area No. 1 of a temporally-smoothed image No. 5, if the least SAD value of 57 is obtained at a position (2, 3) at which an input image No. 2 is present, the association of the temporally-smoothed image No. 5, the local area NO. 1, the input image No. 2, the least SAD value of 57 and the position (2, 3) on the input image is held in the BM calculation result holder 64. Here, the temporally-smoothed image number is a number specifying a temporally-smoothed image. The local area number is a number specifying a local area of the temporally-smoothed image. The input image number is a number specifying an input image. The position on the input image is a position on the input image at which the least SAD value is obtained, and is represented, for example by a relative coordinate (2, 3).

Figure 8:
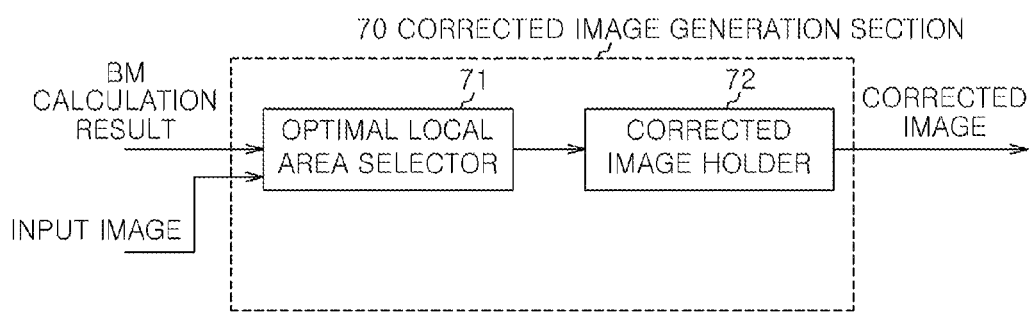
FIG. 8 is a view showing the configuration of a corrected image generation section according to the first example of the embodiment of the present invention.

FIG. 8 is a view showing the configuration of the corrected image generation section 70 according to the first example. The corrected image generation section 70 includes an optimal local area selector 71 and a corrected image holder 72. Based on the BN calculation result held in the BM calculation result holder 64 of the similarity determination section 60, the optimal local area selector 71 selects a partial area (having the same size as the local area) having the highest similarity from the plurality of time-series input images held in the input image holder 62, for each of the local areas in the unit of N×N pixels of the temporally-smoothed image subjected to the BM calculated, and reads the selected partial area, as the optimal local area, from the input image holder 62. Thereafter, the optimal local area selector 71 generates an image in which a plurality of optimal local areas respectively selected for the local areas of the temporally-smoothed image is bonded over the entire area of the temporally-smoothed image, and holds the generated image, as a corrected image, in the corrected image holder 72. The corrected image holder 72 outputs the held corrected image to the image display unit 43 of the image monitor.

Figure 9:
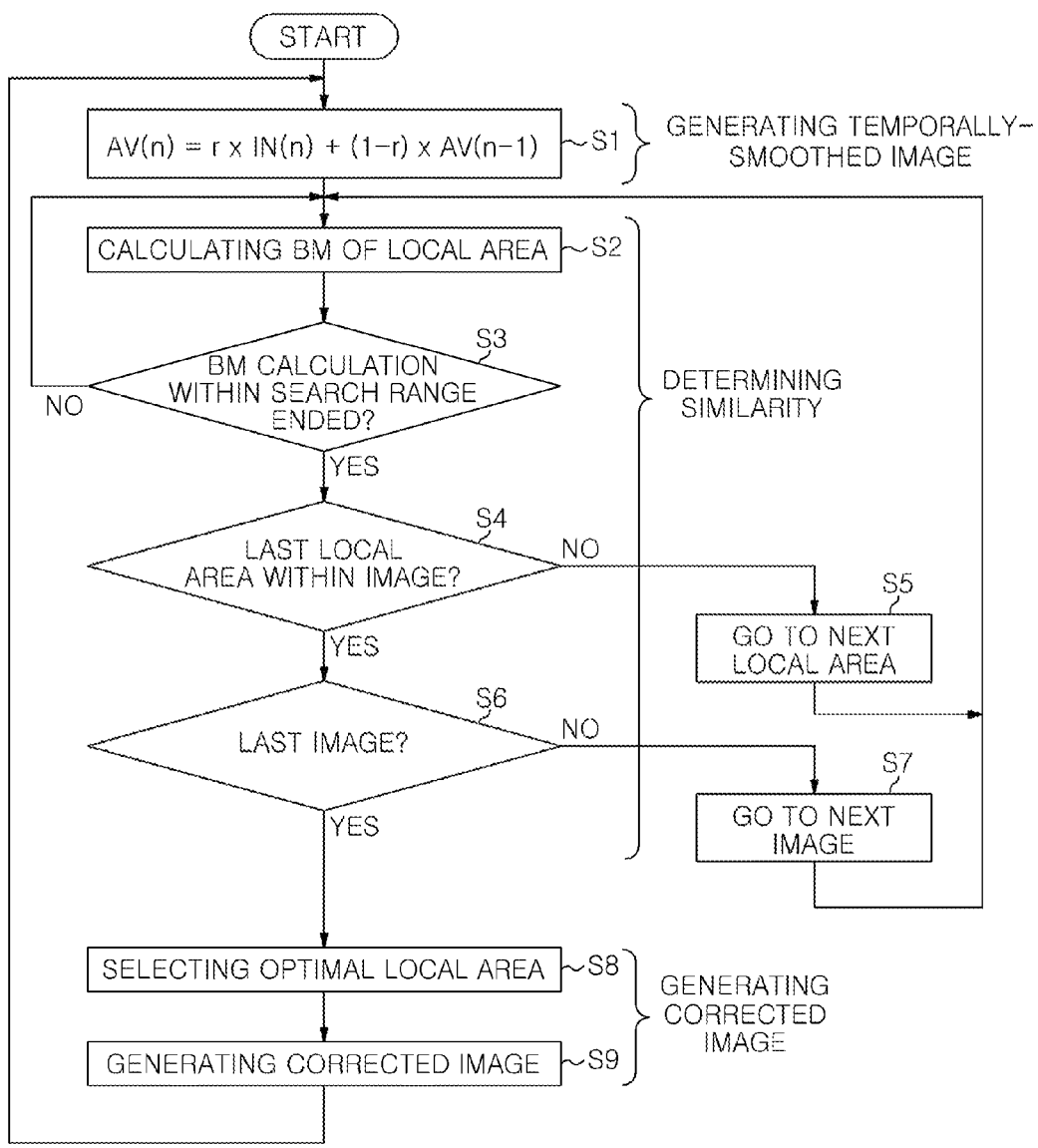
FIG. 9 is a view for explaining a flow of image processing according to the first example of the embodiment of the present invention.

The above-described process can be summarized as a process flow of FIG. 9. FIG. 9 is a view for explaining a flow of image processing of the shimmer correction unit 42 according to the first example. In the present disclosure, a local area and a partial area have the same meaning in that they are some areas within one image frame. However, for the purpose of easy understanding of the description, in some cases, the local area may be used for the temporally-smoothed image and the partial area may be used for the input image.

First, the temporally-smoothed image generation section 50 generates a temporally-smoothed image according to the smoothing process of Equation 1 (Step S1). Next, the similarity determination section 60 calculates and determines similarity of a plurality of time-series input images for each of local areas of the temporally-smoothed image, according to Steps S2 to S7. Next, the corrected image generation section 70 selects partial areas having the highest similarity (optimal local areas) for each of the local areas of the temporally-smoothed image, from the plurality of time-series input images, and generates a corrected image by combining the plurality (corresponding to the number of local areas) of optimal partial areas (optimal local areas) in a non-overlapping manner.

In more detail, after Step S1, for a first local area of the temporally-smoothed image, the similarity determination section 60 calculates similarity between an image of the first local area and an image of a partial area within a search range set for a first time-series input image (Step S2). The similarity determination section 60 determines whether or not the similarity calculation for all partial areas within the set search range is ended (Step S3). If not ended (NO in Step S3), the process returns to Step S2 where the similarity calculation for the partial areas within the set search range continues.

If the similarity calculation for the partial areas within the set search range is ended (YES in Step S3), it is determined whether or not the local area subjected to the similarity calculation is the last local area of the temporally-smoothed image (Step S4). If the local area subjected to the similarity calculation is not the last local area (NO in Step S4), the local area to be processed is shifted to the next local area of the temporally-smoothed image (Step S5) and then the process returns to Step S2 where the similarity calculation for the next local area is performed.

If the local area subjected to the similarity calculation is the last local area the temporally-smoothed image (YES in Step S4), it is determined whether or not the local area subjected to the similarity calculation is the last input image of the plurality of time-series images (Step S6). If the local area subjected to the similarity calculation is not the last input image (NO in Step S6), the processing target is shifted to the next input image (Step S7) and then the process returns to Step S2 where the similarity calculation for the next input image is performed.

If the local area subjected to the similarity calculation is the last input image (YES in Step S6), the corrected image generation section 70 selects partial areas having the highest similarity (optimal local areas) for each of the local areas of the temporally-smoothed image (Step S8), and generates a corrected image by combining the plurality of selected optimal partial areas (optimal local areas) in a non-overlapping manner (Step S9). Thereafter, the process returns to Step S1.

According to the above-described first example, at least the following effects (A1) to (A3) can be obtained.

(A1) Since partial areas having high similarity for each of the local areas of the temporally-smoothed image are selected from the plurality of time-series input images and the corrected image is generated by combining these selected partial areas, it is possible to provide less deterioration of a sense of resolution and less distortion of image than conventional.

(A2) Since a search range for the input image is set to be wider than the local areas of the temporally-smoothed image and narrower than the overall area of the input image, it is possible to reduce the processing amount of similarity calculation as compared to the case of searching the overall area of the input image.

(A3) When partial areas of the plurality of time-series input images having high similarity are smoothed to the extent that a sense of resolution is not lost and are used to generate corrected images, it is possible to make seams of the corrected images generated from the plurality of local areas inconspicuous.

SECOND EXAMPLE

An image processing apparatus according to a second example will now be described. The image processing apparatus of the second example is the same telescopic camera surveillance system as the first example but is different from the first example in that an input image is classified into two or more categories for shimmer correction. That is, even under shimmer conditions, a background image and a moving body image are accurately distinguished from each other by a histogram comparison technique robust to image deformation. For example, the input image is classified into a moving body area, a background area and an immediately after-moving body-passing-area and is subjected to image processing (filtering) according to the classification. For example, an image subjected to the same shimmer correction as the first example is taken as an output for the background area, whereas an input image or a moving body-removed image is taken as an output for other areas.

Figure 10:
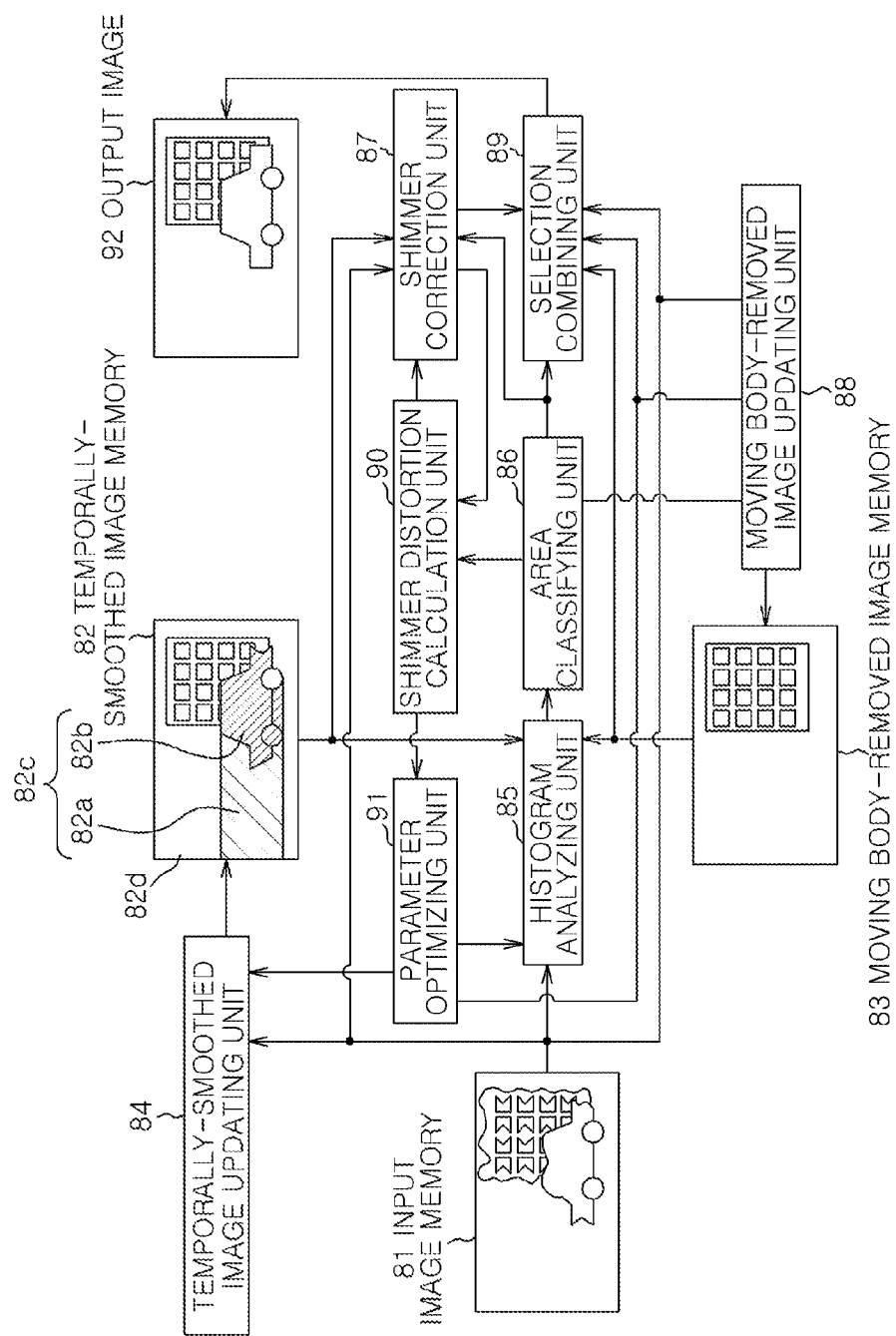
FIG. 10 is a view showing the configuration of an image processing apparatus according to a second example of the embodiment of the present invention.

FIG. 10 is a view showing the configuration of the image processing apparatus according to the second example, which includes a shimmer correction device corresponding to the shimmer correction unit 42 shown in the first example. The shimmer correction device includes an input image memory 81, a temporally-smoothed image memory 82, a moving body-removed image memory 83, a temporally-smoothed image updating unit 84, a histogram analyzing unit 85, an area classifying unit 86, a shimmer correction unit 87, a moving body-removed image updating unit 88, a selection combining unit 89, a shimmer distortion calculation unit 90 and a parameter optimizing unit 91.

The input image memory 81 holds a plurality of time-series input images. The temporally-smoothed image updating unit 84 creates a temporally-smoothed image based on the plurality of time-series input images output from the input image memory 81. This created temporally-smoothed image is the same as the temporally-smoothed image in the first example and is also called a time smoothing image. The temporally-smoothed image memory 82 holds the temporally-smoothed image created in the temporally-smoothed image updating unit 84, i.e., a temporally-smoothed image obtained by smoothing all pixels within a screen of a plurality of temporally-closed time-series input images.

Reference numeral 82a in an image in the temporally-smoothed image memory 82 shown in FIG. 10 denotes an immediately after-moving body-passing-area representing an area immediately after a moving body passes. Reference numeral 82b denotes a moving body area representing an area of a moving body. Since the moving body is moving during the temporal smoothing process, the immediately after-moving body-passing-area 82a and the moving body area 82b become blurred images. Although it is shown in FIG. 10 that the immediately after-moving body-passing-area 82a and the moving body area 82b are distinguished from each other for the sake of convenience of description, they cannot be distinguished from each other in the actual temporally-smoothed image. A combination of the immediately after-moving body-passing-area 82a and the moving body area 82b is referred to as a moving body and passage area 83c. In the image in the temporally-smoothed image memory 82 shown in FIG. 10, a portion except the moving body and passage area 83c (the combination of 82a and 82b) is a background area 82d.

The histogram analyzing unit 85 creates a histogram for each of partial images of two types of images and calculates a difference for estimating similarity between the two images. For example, the histogram analyzing unit 85 creates a histogram for each of partial images of two temporally-smoothed input images output from the input image memory 81 and calculates a difference therebetween for estimating similarity between the two temporally-smoothed input images. In addition, the histogram analyzing unit 85 creates histograms for a partial image of the input image output from the input image memory 81 and a partial image of the temporally-smoothed input image and calculates a difference therebetween for estimating similarity between the input image and the temporally-smoothed input image.

The area classifying unit 86 classifies areas based on the difference calculated by the histogram analyzing unit 85. Based on the difference (i.e., similarity) between the two temporally-smoothed input images, i.e., a most recent input image output from the input image memory 81 and a previous input image, the area classifying unit 86 performs the area classification to determine whether or not an area is an area of the moving body (the moving body area 82b), at least in the unit of block (corresponding to the local area in the unit of N×N pixels in the first example). If the difference is large, this area is determined as a moving body image or an equivalent area.

In addition, based on the difference between a most recent input image output from the input image memory 81 and the temporally-smoothed input image, the area classifying unit 86 performs the area classification to determine whether an area is the moving body and passage area 82c or the background area 82d, at least in the unit of block (corresponding to the local area in the unit of N×N pixels in the first example). If the difference is small, this area is determined as the background area.

In addition, based on the result of the above area classification, the area classifying unit 86 performs the area classification to determine whether an area is the immediately after-moving body-passing-area 82a, the moving body area 82b or the background area 82d, at least in the unit of block (corresponding to the local area in the unit of N×N pixels in the first example).

In this way, in the second example, the histogram analyzing unit 85 or the area classifying unit 86 performs the area classification (determination on whether an area is the moving body area 82b, the immediately after-moving body-passing-area 82a or the background area 82d) at least in the unit of block (corresponding to the local area in the unit of N×N pixels in the first example). A result of the area classification is output to the shimmer correction unit 87, the moving body-removed image updating unit 88, the selection combining unit 89 and the shimmer distortion calculation unit 90.

The shimmer correction unit 87 has the function corresponding to the similarity determination section and the corrected image generation section 70 in the first example and subjects the plurality of time-series input images output from the input image memory 81 to the same shimmer removal process as the first example by referring to the temporally-smoothed image output from the temporally-smoothed image memory 82. The shimmer correction unit 87 operates in an area determined not to be the moving body and passage area 82c in the current input image (i.e., the background area 82d). The shimmer correction unit 87 outputs the corrected image in the background area 82d to the selection combining unit 89 and outputs a motion vector of the current image, which is obtained in the block matching (BM) as necessary, to the shimmer distortion calculation unit 90. In addition, the shimmer correction unit 87 controls a search range of the block matching adaptively according to the strength of distortion given from the shimmer distortion calculation unit 90.

The moving body-removed image updating unit 88 is input with an output image 92 or the input image output from the input image memory 81, obtains an exponential moving average image by applying the same update equation as Equation 1 in the first example for the area determined as the background area 82d by the area classifying unit 86, and outputs the obtained exponential moving average image as a moving body-removed image. In addition, a previous moving body-removed image in which the current moving body is not reflected is not updated and is held, as it is, in the moving area 82b and the immediately after-moving body-passing-area 82a in the moving body-removed image. In this way, based on the area classification result from the area classifying unit 86, for example for the input image output from the input image memory 81, the moving body-removed image updating unit 88 creates and updates a moving body-removed image from which the moving body is removed by smoothing the plurality of time-series input images in the background area 82d. That is, based on the plurality of time-series input images and the area classification result from the area classifying unit 86, the moving body-removed image updating unit 88 generates the moving body-removed image by smoothing the plurality of time-series input images in the background area 82d.

The moving body-removed image memory 83 holds the moving body-removed image output from the moving body-removed image updating unit 88, i.e., an image (moving body-removed image) obtained by subjecting an image, which is obtained by removing the moving body from the input image, to the time-series smoothing process.

Based on the area classification result from the area classifying unit 86, the selection combining unit 89 outputs the corrected output image 92. That is, based on the area classification result from the area classifying unit 86, the selection combining unit 89 selects the shimmer corrected image from the shimmer correction unit 87 in the background area 82d, selects the input image output from the input image memory 81 in the moving body area 82b, selects the moving body-removed image output from the moving body-removed image memory 83 in the immediately after-moving body-passing-area 82a, or selects the input image output from the input image memory 81, as will be described later, and outputs these images in combination. Accordingly, no shimmer correction is made in the moving body area 82b and the immediately after-moving body-passing-area 82a but the shimmer correction can be made in the background area 82d.

In addition, since an area boundary is noticeable in the output combined image if the spatial accuracy of the area classification is rough, the area classification used in the selection combining unit 89 is performed in the unit of pixels or a spatial domain filter is appropriately applied to the vicinity of a boundary between blocks or areas.

Based on the area classification result from the area classifying unit 86 and the image correction result from the shimmer correction unit 87, the shimmer distortion calculation unit 90 calculates the strength of distortion due to shimmer in the background area 82d. More specifically, for example, based on a motion vector representing an image displacement due to shimmer obtained from the shimmer correction unit 87, the shimmer distortion calculation unit 90 obtains the strength of distortion, the temporal frequency of displacement, average displacement (global motion vector) and do on. The average displacement refers to averaging all motion vectors within one input image frame. The strength of distortion can be calculated based on the variance of displacement of all motion vectors within one input image frame. The lager variance provides the larger strength of distortion.

The strength and frequency of distortion are provided to the parameter optimizing unit 91 and various parameters output from the parameter optimizing unit 91 are used to adaptively control characteristics of a spatial or temporary domain filter in the temporally-smoothed image updating unit 84, the moving body-removed image updating unit 88 or the selection combining unit 89.

The parameter optimizing unit 91 optimizes the various parameters based on the strength and frequency of distortion due to shimmer output from the shimmer distortion calculation unit 90, and outputs the optimized parameters to the temporally-smoothed image updating unit 84, the moving body-removed image updating unit 88 or the selection combining unit 89.

In addition, the average displacement is appropriately provided to the shimmer correction unit 87 and is used as an offset of a search area in the input image. That is, if the average displacement is larger than the search range (i.e., the variance of motion vector) in the input image, the operation of the shimmer correction device is reset. That is, the contents of the input image memory 81, the temporally-smoothed image memory 82 and the moving body-removed image memory 83 are reset and an operation of storage of input image into the input image memory 81 is started.

Thus, the shimmer correction is possible even under the circumferences where the parallel movement of image due to the deviation of the imaging direction of camera is larger than the search range in the input image. The selection combining unit 89 regards an area, which can be determined that the shimmer correction successful (the global motion vector used by the shimmer correction unit is less than a first predetermined value and an obtained SAD value is less than a second predetermined value), as the background area 82d, even in an area determined as the moving body area 82b by the area classifying unit 86.

The second embodiment is configured to include both of the temporally-smoothed image updating unit 84 and the moving body-removed image updating unit 88. However, for example, if the selection combining unit 89 selects the input image in the immediately after-moving body-passing-area 82a, the creation of the moving body-removed image in the moving body-removed image updating unit 88 is not essential and the moving body-removed image updating unit 88 may be omitted. On the contrary, if the shimmer correction unit 87 uses the moving body-removed image instead of the temporally-smoothed image, the creation of the temporally-smoothed image in the temporally-smoothed image updating unit 84 may be omitted, i.e., the temporally-smoothed image updating unit 84 may be omitted.

In addition, the shimmer distortion calculation unit 90 and the parameter optimizing unit 91 are preferably provided although they are not essential.

According to the above-described second example, at least the following effects (B1) to (B3) can be obtained.

(B1) Since the background area 82d and moving body and passage area 82c of the input image are identified, the background area 82d is subjected to the shimmer correction, and the background area 82*d* subjected to the shimmer correction and the moving body and passage area 82*c* subjected to no shimmer correction are combined to generate the output image, the shimmer correction of the background area 82*d* is possible even when a moving body exists within the input image.

(B1) In addition, an image close to the reality can be generated by identifying the moving body area 82*b* and the immediately after-moving body-passing-area 82*a* and using the moving body-removed image in the immediately after-moving body-passing-area 82*a*.

(B3) Since the operation of the shimmer correction device is reset if the average displacement is larger than the search range in the input image, the shimmer correction is possible even under the circumferences where the parallel movement of image due to the deviation of the imaging direction of camera is larger than the search range in the input image.

THIRD EXAMPLE

An image processing apparatus according to a third example will now be described with reference to FIGS. 11 to 15. The image processing apparatus of the third example is an example of implementing the shimmer correction of the first and second examples using a multi-core processor provided in the image display unit 43 of the telescopic camera surveillance system of the first example shown in FIG. 4.

Since the shimmer correction process requires a large amount of computation and a large number of input images (image frames), a scale of processor and memory of the shimmer correction unit incorporated in the camera is increased, which results in increase of costs. In addition, if the process continues under a state where arithmetic processing capability is insufficient, image frames may be missed and real time display with the same frame rate as a captured image cannot be achieved.

However, since the shimmer correction process is performed in the unit of blocks (local areas of the temporally-smoothed image in the first and second examples), this process is compatible with parallel processing. In general, a personal computer has a margin in processing capability for DSP (Digital Signal Processor). In addition, its memory capacity is large and storing image data of several frames is not so critical. In particular, in recent computer technology, the performance of a graphic board for displaying an image on a monitor is being remarkably improved. LSI for performing image processing on the graphics board is called GPU (Graphics Processing Unit). It is common that the GPU has the parallel processing function to perform multiple processing. Taking advantage of the parallel computing performance, the GPU is also being used as GPGPU (General-Purpose Computing on Graphics Processing Unit) applied to physical arithmetic as well as graphics applications.

In this example, the shimmer correction process requiring simultaneous multiple processing is performed with the GPU having the parallel computing performance. Since various GPUs having different performance such as the number of cores, the number of clocks and so on are on the market, the image processing apparatus of the third example includes a function of calculating the maximum number of blocks which can be processed in real time, a function of limiting a shimmer correction range in the input image to match the maximum number of blocks which can be processed, a function of displaying, changing and moving the limited shimmer correction area, and a function of processing only blocks in the limited shimmer correction area. In addition, when the process of creating the temporally-smoothed image is performed, if only the previous image frame is present, each block of the entire screen can be processed with relatively free parallelism, regardless of the shimmer correction range. Thus, real time display of the shimmer correction can be implemented.

For example, in the image display unit 43 of the first example, an image correction area, which can be subjected to real time image correction processing, is displayed on the input image and can be changed in size and moved according to a manipulation by a user. Then, the similarity determination section 60 determines similarity only within the image correction area and the corrected image generation section 70 generates a corrected image only within the image correction area. On the other hand, the temporally-smoothed image generation section 50 generates a temporally-smoothed image over the entire input image from the imaging unit 41, irrespective of the size of the image correction area.

Figure 11:
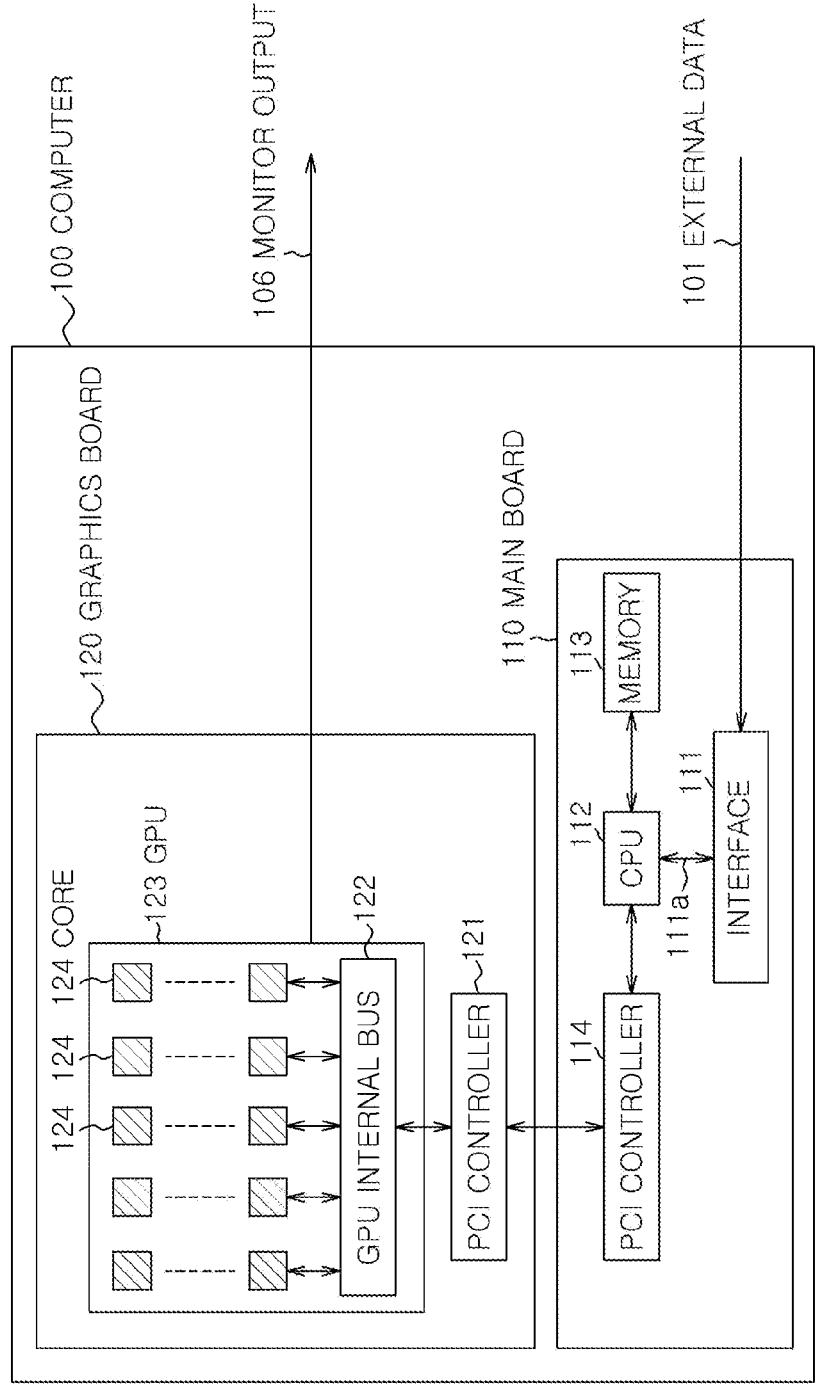
FIG. 11 is a view showing the configuration of an image processing apparatus according to a third example of the embodiment of the present invention.

First, as the background illustrating this example, a configuration example of a computer with a graphics board is shown in FIG. 11. FIG. 11 is a view showing the configuration of the image processing apparatus according to the third example of this embodiment and corresponds to the shimmer correction unit 42 of the first example or corresponds to the image processing apparatus of the second example shown in FIG. 10.

In general, a computer includes various peripheral devices. In the third example, the computer includes a main board 110 and a graphics board 120 which are the minimum configuration required for the shimmer correction process. However, other configurations may be added.

The main board 110 includes a CPU 112, a memory, a PCI (Peripheral Component Interconnect) controller 114 and an interface 111. The main board 110 also shows the required minimum configuration. The CPU 112 controls the overlay operation of the computer 100 and performs an arithmetic process on input data. The memory 113 stores data to be used by the CPU 112 for the arithmetic process and exchanges the data with the CPU 112.

The interface 111 receives external data 101 and outputs the external data 101 to the CPU 112. An example of the interface 111 may include a LAN (Local Area Network), a USB (Universal Serial Bus), eSATA (External Serial Advanced Technology Attachment) or the like. The interface 111 may be of any type of interface, at least as long as it can store the external data 101 transmitted from a camera via a transmission line in the computer 100. For example, a hard disk is connected to the interface 111 and the external data 101 transmitted via the transmission line are once stored in the hard disk. The stored data may be received and processed by the CPU 112.

The PCI controller 114 assumes an interface with an extension board (the graphics board 120 in this example) inserted in a PCI slot. In this example, the PCI controller 114 is of a PCI Express type. However, the PCI controller 114 may be any type, at least as long as it can communicate with the same protocol as a PCI controller 121 mounted on the graphics board and transmit the required amount of data.

The graphics board 120 has the required minimum configuration of the PCI controller 121 and the CPU 123. The PCI controller 121 communicates with the same protocol as the PCI controller 114 on the main board 110 and exchanges data between the graphics board 120 and the main board 110. Data received by the PCI controller 121 are output to a GPU 123. A number of cores 124 connected to a GPU internal bus 122 having a wide band are included in the GPU 123. The number of cores 124 may be several hundreds to several thousands. The GPU 123 has a line-up divided by a performance difference, based on the band of the GPU internal bus 122 and the number of cores 124, from for entry to for high-end represented by a 3D graphics game. Each of the cores 124 is formed of an arithmetic processing unit. The cores 124 are optimally configured such that relatively simple operations represented by the 3D graphics processing are distributed into hundreds of parallel processing and results of the processing are returned to the main board 110 via the high-speed GPU internal bus 122 or image data created from the processing results are output as a monitor output 106.

Figure 12:
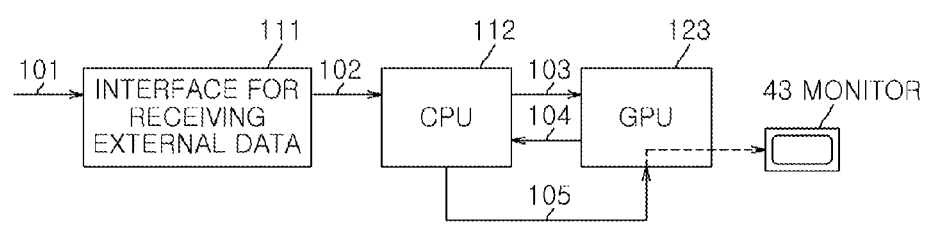
FIG. 12 is a view for explaining a flow of data in the image processing apparatus according to the third example of the embodiment of the present invention.

A flow of data described so far will be described with reference to FIG. 12. FIG. 12 is a view for explaining a flow of data in the image processing apparatus according to the third example.

Image data with shimmer taken by a camera flows in the order of reference numerals 101, 102, 103, 104, 105 and 106 in FIG. 12. External data 101 input from the external is received, as data 102, in the CPU 112 via the interface 111 for reception of the external data. The CPU 112 divides the received image data into blocks and outputs the image data, as data 103 in the unit of blocks, to the GPU 123. The GPU 123 uses the plurality of internal cores 124 to subject the data 103 to the shimmer correction process in parallel and returns the corrected data, as a processing result 104, to the CPU 112. The CPU 112 returns the processing result 104 in the unit of blocks, as image data 105 after shimmer correction of one image frame, to the GPU 123 for monitor display. In addition, if the data of the processing result 104 is image data, since the data can be, as it is, output to the monitor 43, reference numerals 104 and 105 may be omitted and the processing result of the GPU 123 may be directly output, as a monitor output 106, to the monitor 43.

By dividing the image data into blocks as described above, it is possible to allocate the shimmer correction process to each of the cores 124 of the GPU 123. It becomes easy to use the high-speed parallel processing capability to display an image after the shimmer correction on the monitor 43 at the same processing rate as the original image frame rate.

Although it has been illustrated in the above that an image is divided into blocks, a relationship between the number of blocks and the number of cores 124 in the GPU 123 is important. When the number of cores is smaller than number of blocks, the image cannot be displayed in real time and the image frame missing occurs.

Therefore, in the image processing apparatus according to the third example, the capacity of one core 124 of the graphics board 120 is measured and the process of obtaining the maximum number of blocks which can be subjected to a shimmer correction process is performed before the start of the shimmer correction process. The process of obtaining the maximum number of blocks will be hereinafter referred to as a calibration process.

Also, for the number of blocks included in one image frame, if the processing capability of the graphics board 120 is low, the number of blocks to be processed is limited and only blocks in a particular area are subjected to the shimmer correction process while maintaining the frame rate. For a user who is watching a displayed image, in order to allow the user to determine which blocks correspond to the particular area, the blocks included in the particular area are displayed in a fashion different from other blocks. For example, a means for enclosing the blocks included in the particular area with a colored frame may be considered. Although it is simpler to cover the periphery of the particular area with a rectangular frame, it is not necessary to limit the frame to the rectangular shape as long as the number of blocks included within the frame is less than the number which can be processed.

The manner of displaying the particular area will be described with reference to FIGS. 13A to 13D. FIGS. 13A to 13D are views for explaining a shimmer correction area according to the third example, showing cases where a frame enclosing the shimmer correction area is rectangular. Here, a case where a shimmer image 131 of one frame is composed of 7 horizontal blocks and 6 vertical blocks and the number of blocks which can be subjected to the shimmer correction process is 12 will be illustrated.

As shown in FIG. 13A, since the number of blocks which can be subjected to the shimmer correction process is 12, a shimmer correction area 132 including 4 horizontal blocks and 3 vertical blocks is enclosed by a frame. While the blocks enclosed by the frame are subjected to the shimmer correction process, an image fluctuating due to shimmer, which is out of the frame, is displayed as it is. However, the visibility of the image is reduced by the fluctuation due to shimmer, it does not affect much the minimum of judgment necessary as monitoring applications, such as whether or not a photographed object is a human being. Therefore, if something monitored outside the frame of the shimmer correction area 132 has been reflected, since its existence may be aware of even without knowing its details, there causes no problem by providing a means for moving the shimmer correction area 132.

The frame creates frame display data in a part (corresponding to the corrected image generation section 70 in the first example) performing a process of composing one screen with blocks collected as the shimmer image 131, of the CPU 112 or the GPU 123. For example, when the CPU 112 reconfigures data of all blocks as one image data, it is necessary for the CPU 112 to create a frame. When directly outputting a result of processing by the GPU 123 to the monitor 43, it is necessary for the GPU 123 to create a frame.

A user can use a cursor 133, which can be manipulated by an operating means such as a mouse generally connected to the computer, to shift the position of the shimmer correction area 132. For example, by putting the cursor 133 on a portion within the shimmer correction area 132 and moving the cursor 113 while clicking on a mouse button, the position of the shimmer correction area 132 can be shifted in the unit of blocks without changing the shape of the shimmer correction area 132. Since the movement position of the cursor 133 can be detected by the CPU 112, while moving the display position of the shimmer correction area 132 by operating the mouse, blocks to be processed by the CPU 123 are determined by calculating positions of blocks located in the frame.

In addition, the size of the frame of the shimmer correction area 132 can be changed by dragging the frame with the cursor 133. In this example, since the number of blocks in the shimmer correction area 132 is predetermined within 12, a process of restricting the number of blocks to fit the number of blocks which can be subjected to the shimmer correction process is performed for the expansion and contraction of the frame. For example, as shown in FIG. 13A, in the case where the shimmer correction area 132 is composed of 4 horizontal blocks and 3 vertical blocks, when the frame is horizontally expanded by one block, the shimmer correction area 132 has 5 horizontal blocks. Since the number of blocks which can be processed is 12, the number of vertical blocks is calculated as 2.5 (=12÷5). Since the number of blocks is an integer, when the decimal point is truncated, the number of vertical blocks becomes 2. Thus, as shown in FIG. 13B, the shimmer correction area 132 has 10 blocks in total including 5 horizontal blocks and 2 vertical blocks.

From this state, additionally, when the number of horizontal blocks is increased to 6, the number of vertical blocks becomes 2 (=12÷6). Since the 2 vertical blocks are maintained, as shown in FIG. 13C, the shimmer correction area 132 has 12 blocks in total including 6 horizontal blocks and 2 vertical blocks. Additionally, when the number of horizontal blocks is increased by one to 7, since the number of blocks which can be processed, the number of vertical blocks becomes 1.7 (=12÷7). Since the one vertical block is maintained, as shown in FIG. 13D, the shimmer correction area 132 has 7 blocks in total including 7 horizontal blocks and one vertical block. Also, when the cursor 133 is operated such that the number of blocks of the shimmer correction area 132 exceeds the number of blocks which can be processed, the shimmer correction area 132 cannot be further expanded. Therefore, the operation is limited without changing the display of frame.

In addition, if the number of blocks which can be processed is larger than the total number of blocks included in one screen, all the blocks included in the one screen can be subjected to the shimmer correction process. In this case, the frame of the shimmer correction area 132 is not displayed or is displayed with the largest size which is equal to the size of the screen.

As described above, in the third example, an image correction area which can be subjected to image correction (shimmer correction) in real time is displayed on the image display unit 43 and the image correction area can be changed in size or shifted according to a manipulation by an operator.

In addition, as described above, if the blocks of the entire screen cannot be processed within one frame period, blocks to be subjected to the shimmer correction process are limited by displaying the shimmer correction area 132. However, even in this case, a seamless operation for the entire screen may be required. This is a process (corresponding to the time smooth image generating process in the first example) of creating a temporally-smoothed image smoothed by integrating all pixels in the screen using a plurality of input images temporally close to the shimmer correction process. Since this process requires a previous image frame irrespective of the shimmer correction area 132, this process performs continual temporal integration for the blocks of the entire screen. This is because this process needs to be beforehand performed for the entire screen since a user may change the shimmer correction area 132 and cannot know which block to be allocated to the shimmer correction area 132. Since this integration process can be realized by simply adding or dividing (or bit-shifting) data of an image frame, the processing load is not much increased and the influence on a processing rate for the entire screen is less.

Next, a means for measuring the maximum number of blocks whose shimmer can be corrected by the graphics board 120 will be described with reference to FIGS. 14A to 14D. FIGS. 14A to 14D are views for explaining a method of calculating the number of shimmer correctable blocks according to the third example.

In graphs from FIGS. 14A to 14D, a vertical axis represents processing time of the shimmer correction process and a horizontal axis represents the number of cores in the GPU 123. In order to perform the shimmer correction process in real time, a shimmer correction process of one frame must be terminated at the same frame rate as an input image. For example, the frame rate of the input image is about 33 ms as in an NTSC system. If the shimmer correction processing time of one frame exceeds 33 ms, this means that real-time processing cannot be realized. Therefore, as shown in FIGS. 14A to 14D, a horizontal line (dotted like) is drawn at a position of 33 ms. It is assumed in this example that the number of cores in the GPU 123 is 3. The actual GPU 123 has hundreds of cores but a measuring means does not matter in the same way of thinking. Calculation time taken for one shimmer correction process is all the same. This is because the amount of calculation does not depend on the input image.

Figure 14A:
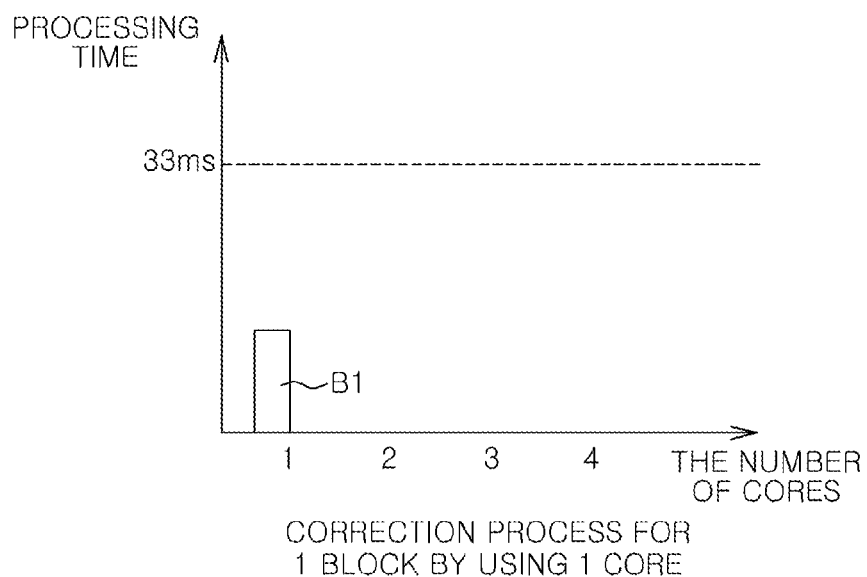
FIGS. 14A to 14D are views for explaining a method of calculating the number of shimmer correctable blocks according to the third example of the embodiment of the present invention.

FIG. 14A shows a state where the shimmer correction process for one block B1 is performed by one core. The processing time is less than 33 ms, the number of cores is one, and the number of cores in the GPU 123 does not exceed 3. Therefore, in the case of FIG. 14A, it can be determined that the shimmer correction process can be performed in real time.

Figure 14B:
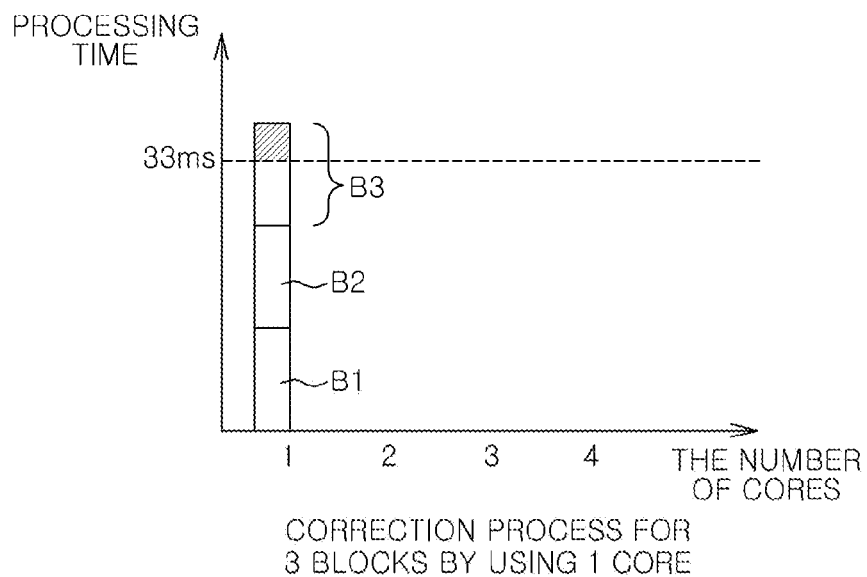

FIG. 14B shows a state where the shimmer correction process for three blocks B1 to B3 is performed by one core. The processing time is less than 33 ms, the number of cores is one, and the number of cores in the GPU 123 does not exceed 3. Therefore, in the case of FIG. 14A, it can be determined that the shimmer correction process can be performed in real time. Even with one core, if the processing time is delayed, it is possible to perform multi-processing. In the case of FIG. 14B, during the shimmer correction process of the third block B3, the processing time exceeds 33 ms. Therefore, it can be determined that the shimmer correction process for three blocks can be performed with one core in real time.

Figure 14C:
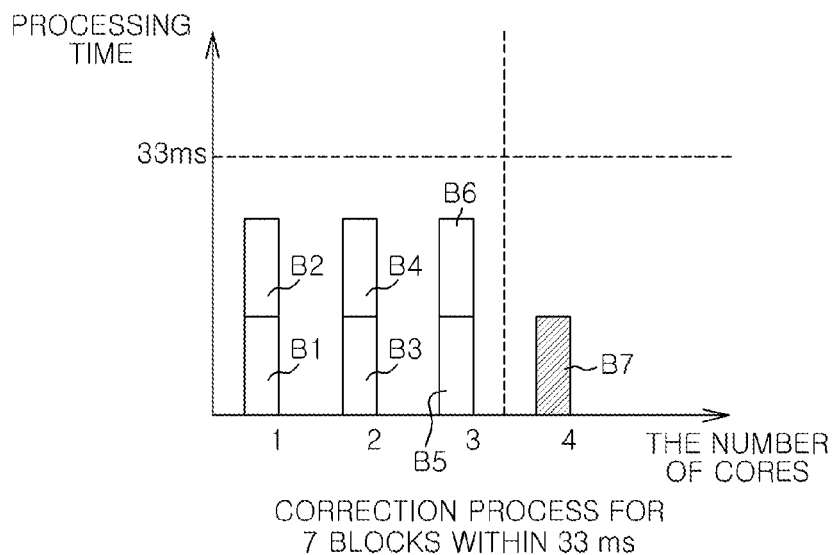

From the results of FIG. 14B, the shimmer correction process in this example can correct shimmer of up to two blocks with one core. Thus, FIG. 14C shows a state where shimmer of 7 blocks B1 to B7 is corrected with the conditions that one core processes up to two blocks to end in time within 33 ms. Since the number of cores is 3, it can be determined that the number of cores is insufficient to process the seventh block B7.

Figure 14D:
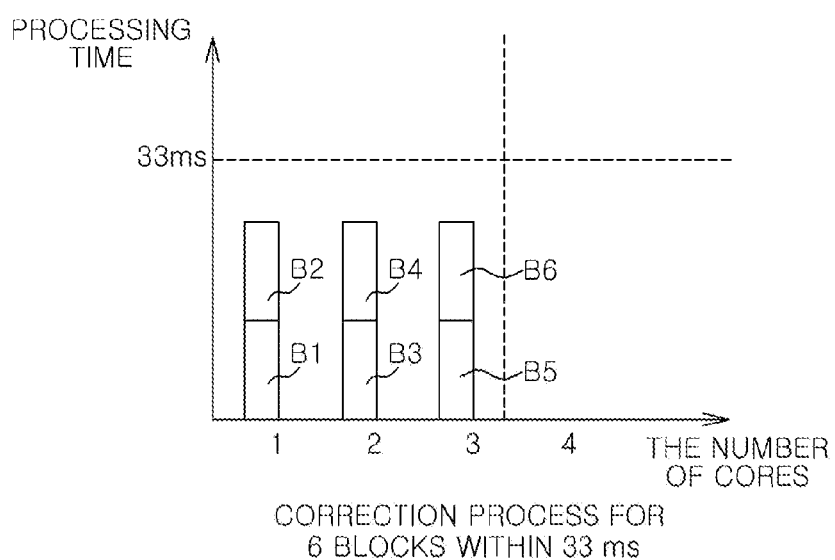

FIG. 14D shows a state where the maximum performance can be exhibited with the conditions that one core performs the shimmer correction process for two blocks and the number of cores is 3. In this case, it can be determined that the shimmer correction process for up to 6 (2×3) blocks is possible. If a shimmer image is divided into 6 blocks, the shimmer correction process can be performed for the entire screen in the graphics board. If the shimmer image is divided into 7 or more blocks, it can be determined that the shimmer correction process cannot be performed in real time unless the above-described shimmer removal area display is used together.

Figure 15:
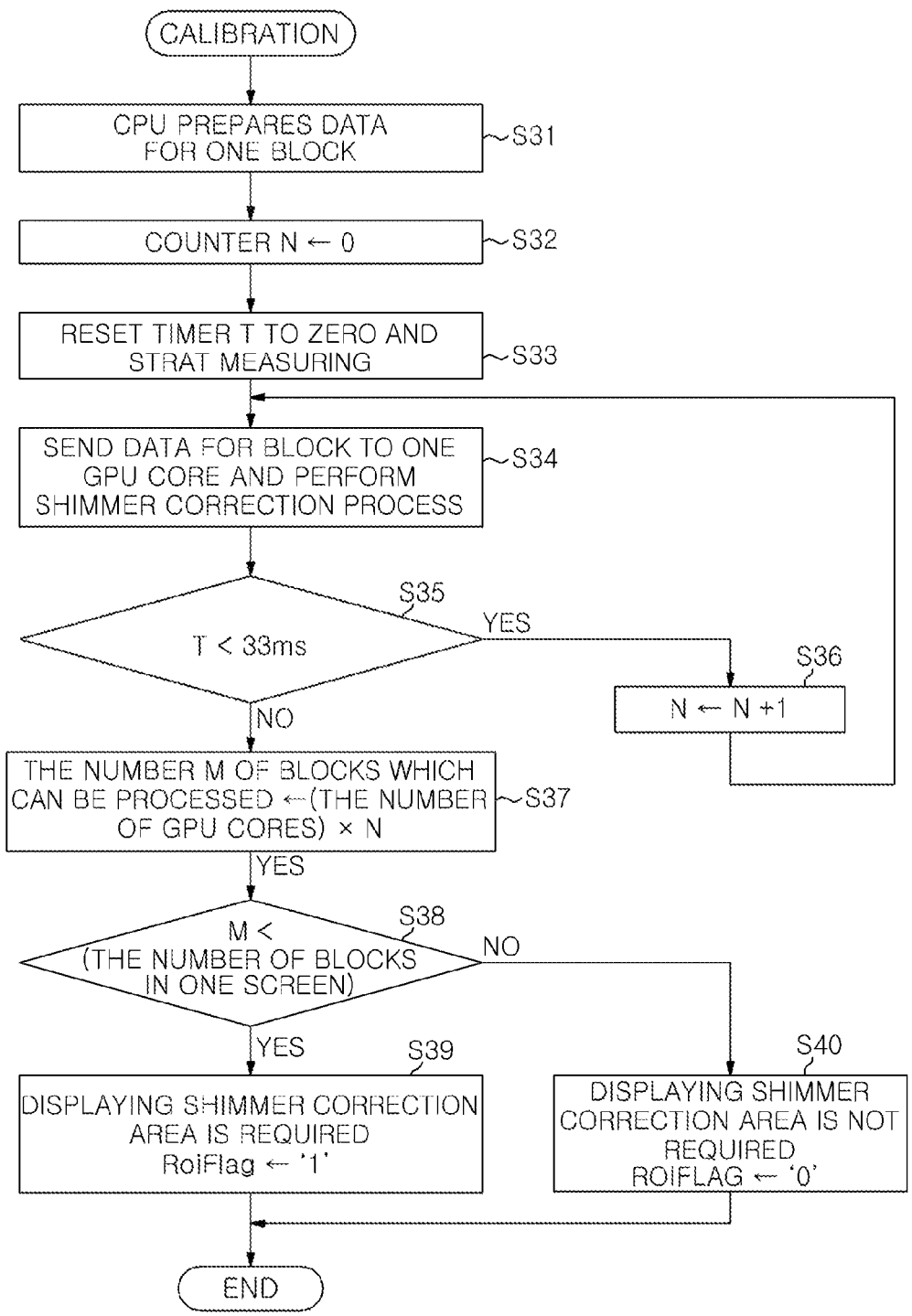
FIG. 15 is a view for explaining a flow of calibration process according to the third example of the embodiment of the present invention.
Figure 16:
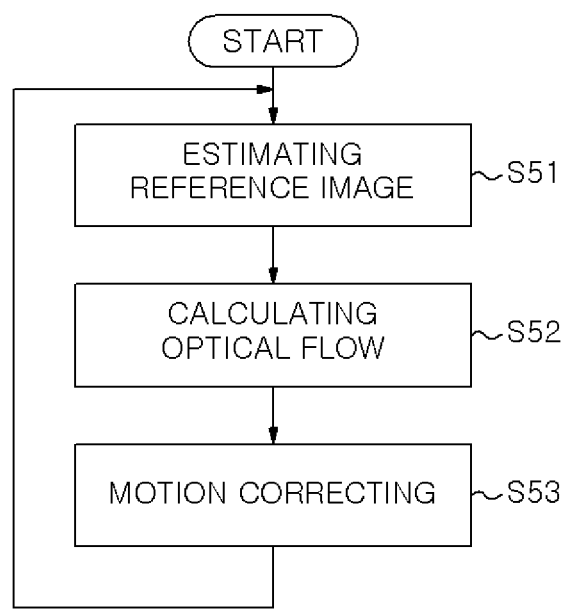
FIG. 16 is a view for explaining a flow of image processing according to a conventional example.
Figure 17:
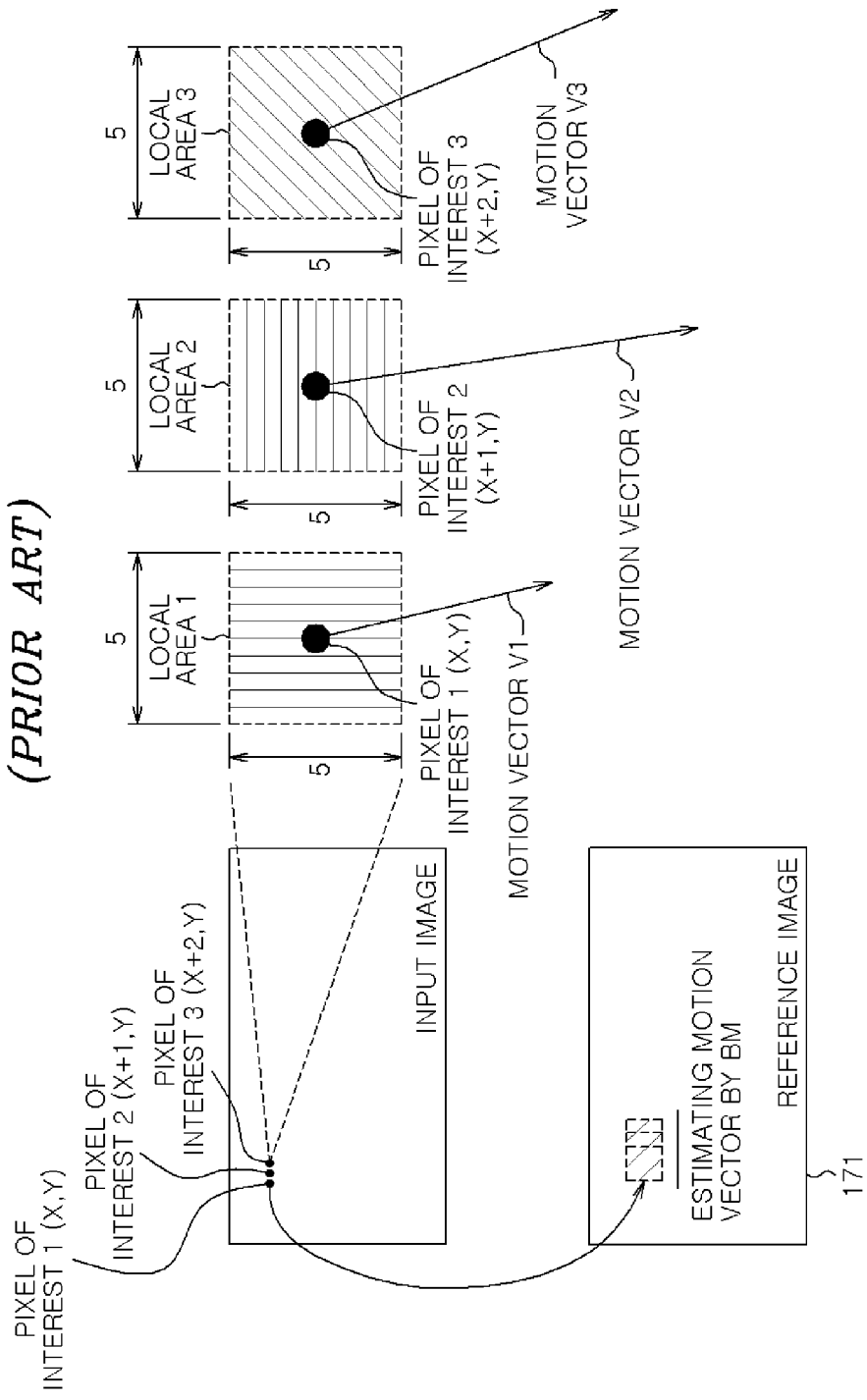
FIG. 17 is a view for explaining motion vector estimation processing according to the conventional example.
Figure 18:
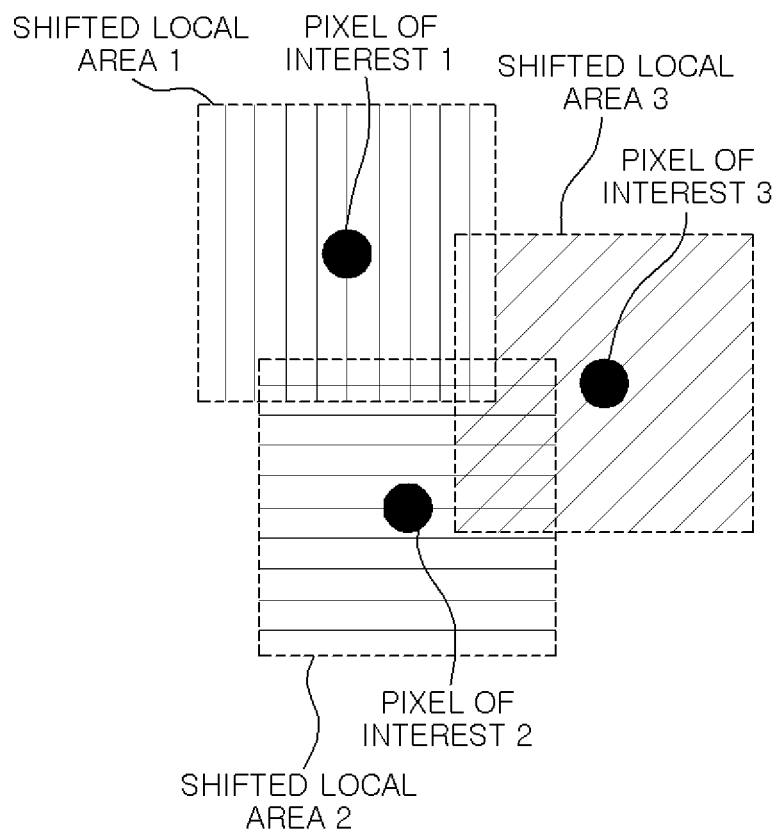
FIG. 18 is a view for explaining corrected image generation processing according to the conventional example.

A procedure of the above-described calibration process for obtaining the maximum number of blocks which can be processed will be described with reference to the flow chart of FIG. 15. FIG. 15 is a view for explaining a flow of calibration process according to the third example. The idea of this procedure is to calculate how many blocks can be processed in time of one image frame by processing one block with one core 124 of the GPU 123 and measuring a time required for the process. As a prerequisite, with the knowledge of the number of cores in the graphics board 120, it is necessary that the processing time for one block can be applied to the entire image frame. The acquisition of the number of cores in the former does not matter since it is common that a means for acquiring the number of cores from the graphics board 120 is prepared. In the latter, since the processing time of the shimmer correction is not changed by the contents of blocks, i.e., values of image data, the processing time of the shimmer correction can be represented by the processing time of one block, which does not matter.

In Step S31 of FIG. 15, image data of one block is prepared by the CPU 112. As described above, since the shimmer correction process does not depend on the value of the image data, any image data, for example, a test pattern such as a suitable blue background, an actual image, etc., may be prepared.

In Step S32, the CPU 112 initializes a counter N to zero. The counter N is provided to count how many times the shimmer correction process could be performed in one frame period.

In Step S33, the CPU 112 resets a timer T to zero and starts count-up of the timer T. The timer T may use a timer function typically equipped in the computer 100. The accuracy of the timer T does not matter in about 1 ms but it is desirable if finer time can be measured. The count-up of the timer T is started from Step S33 and a time required for the shimmer correction process to be performed in the subsequent Step S34 can be measured.

In Step S34, the CPU 112 passes over the block data prepared in Step S31 to one core 124 of the GPU 123 and the core 124 performs the shimmer correction process, Even during the shimmer correction process, the timer T started in Step S33 continues to count up.

In Step S35, the CPU 112 determines whether or not the time indicated by the timer T is less than the one frame period of 33 ms. If the time taken for the shimmer correction process is shorter than 33 ms, there is a possibility that the same core 124 can be used to perform the shimmer correction process once more. Therefore, if the timer T is less than 33 ms (YES in Step S35), Step S36 is performed. If the timer T is 33 ms or more (NO in Step S35), since this means that the time taken for the shimmer correction process exceeds the one frame period, Step S37 is performed.

In Step S36, the CPU 112 increments the value the counter N by +1 in order to perform the next shimmer correction process. If Step S36 is an initial process to start the calibration process, the value N is zero and becomes 1 by performing Step S36. That is, this means that the shimmer correction process can be performed at least once in the one frame period. After Step S36, the process returns to Step S34 where the second and subsequent shimmer correction process is performed.

In Step S37, since the time taken for the shimmer correction process exceeded the one frame period, the CPU 112 calculates the number M of blocks which can be processed by the GPU 123. By integrating the counter N and the known number of cores in the GPU 123, the CPU 112 calculates how many blocks can be processed when using all of the cores in the GPU 123.

In Step S38, the CPU 112 determines whether or not the calculated number M of blocks which can be processed is smaller than the number of blocks occupied in the image of one screen. The number of blocks in the one screen is known in advance since it can be uniquely found from the screen size. If the number M of blocks which can be processed is smaller (YES in Step S38), all of the blocks of the one screen cannot be processed. Therefore, the CPU 112 determines that the shimmer correction area display is required, and performs Step S39. In Step S39, 1 is set in a flag RoiFlag in order to indicate that the shimmer correction area display is required.

If the number of blocks occupied in the image of one screen is equal to or smaller than the number M of blocks which can be processed (NO in Step S38), the CPU 112 determines that no shimmer correction area display is required, and performs Step S40. In Step S40, 0 is set in the flag RoiFlag in order to indicate that no shimmer correction area display is required.

When Step S39 or Step S40 is terminated, the calibration process is completed.

According to the above processing flow, it is possible to obtain the flag RoiFlag to determine whether or not the number M of blocks which can be processed by the GPU 123 mounted on the graphics board 120 and the shimmer correction area display is required. The number M and the flag RoiFlag are used when the CPU 112 displays the above-described shimmer correction area on the monitor 43.

As described above, the apparatus for displaying an image subjected to shimmer correction using the computer 100 includes the function of calculating the number of blocks which can be shimmer-corrected to fit the graphics board having the performance varying depending on the number of cores and the speed of the internal bus, and the function of displaying the shimmer correction area on the monitor based on the number of blocks which can be processed. Accordingly, it is possible to realize an image processing apparatus as a shimmer correction apparatus capable of real-time shimmer correction of the same display rate as the input image frame rate.

Although, in the third example, image processing has been illustrating with the shimmer correction process, the present disclosure is not limited to the shimmer correction process as long as the image processing can divide an image frame into blocks. For example, for image filter processing such as super-resolution processing, fluctuation correction processing, edge sharpening and the like, the image frame may be parallelized into blocks which are processed by the GPU 123 and areas showing only a range that can be processed may be displayed on the monitor.

In addition, although it has been illustrated in the above that the parallel arithmetic processing is performed by the GPU 123 mounted on the graphics board 120, the present disclosure is not limited to the graphics board 120 as long as the parallel arithmetic processing can be performed in the unit of blocks. For example, the above processing may be performed by a dedicated LSI mounting board incorporating a plurality of dedicated hardware or a CPU which incorporates a plurality of core processors to execute a plurality of software in parallel.

According to the above-described third example, at least the following effects (C1) to (C3) can be obtained.

(C1) Since the shimmer correction process can be performed in parallel for each block, it is possible to increase a processing speed and realize real time processing with ease.

(C2) Since the shimmer correction area which can be subjected to the shimmer correction process in real time can be displayed and a user (operator) can change and shift the shimmer correction area, it is possible to perform shimmer correction for a required portion even in a shimmer correction device which cannot subject the entire screen to a real-time shimmer correction process.

(C3) It is possible to calculate the number of blocks which can be subjected to a real-time shimmer correction process.

The present disclosure is not limited to the above embodiment and it is to be understood that various modifications can be made without departing from the scope and spirit of the present disclosure.

The present disclosure includes at least the following configurations.

As a first configuration, there is provided an image processing apparatus including:

an imaging unit for outputting an imaging result as a time-series image; and an image correction unit, to which the time-series image outputted from the imaging unit is inputted as an input image, for correcting image fluctuation in the input image, wherein the image correction unit includes:

a temporally-smoothed image generation section which generates, based on a plurality of time-series input images from the imaging unit, a temporally-smoothed image by smoothing the plurality of the time-series input images;

a similarity determination section which sets a local area for the temporally-smoothed image generated by the temporally-smoothed image generation section and determines similarities between the local area in the temporally-smoothed image and partial areas of the plurality of the time-series input images; and a corrected image generation section which selects, from the partial areas of the plurality of the time-series input images, a partial area of the input image having an image similar to an image of the local area of the temporally-smoothed image based on a similarity determination result calculated by the similarity determination section, and generates a corrected image based on the selected partial area.

As a second configuration, in the image processing apparatus according to the first configuration, the similarity determination section sets a plurality of local areas for the temporally-smoothed image and determines similarities between each of the plurality of the local areas in the temporally-smoothed image and the partial areas of the plurality of the time-series input images, and the corrected image generation section selects, from the partial areas of the plurality of the time-series input images, partial areas of the input image having images similar to images of the plurality of the local areas based on the similarity determination result calculated in the similarity determination section, and generates the corrected image based on the selected partial areas.

As a third configuration, in the image processing apparatus according to the first or second configuration, the similarity determination section sets a search range for searching the partial area in the input image and determines similarity between the local area in the temporally-smoothed image and the input image within the search range.

As a fourth configuration, in the image processing apparatus according to the third configuration, the similarity determination section sets the search range based on a motion vector in the local area.

As a fifth configuration, in the image processing apparatus according to any one of the second to fourth configurations, the corrected image generation section smoothes the plurality of selected partial areas.

As a sixth configuration, in the image processing apparatus according to any one of the second to fifth configurations, the image correction unit further includes:

an area classifying section which classifies the input image from the imaging unit into a moving body and passage area composed of a moving body area and an immediately after-moving body-passing-area, and a background area other than the moving body and passage area; and a selection combining section which selects the input image from the imaging unit for the moving body and passage area, selects the corrected image corrected by the image correction unit for the background area, and combines the selected input image and the selected corrected image.

As a seventh configuration, in the image processing apparatus according to the sixth configuration, the image correction unit further includes:

a moving body-removed image updating section which generates, based on the plurality of the time-series input images from the imaging unit and an area classification result from the area classifying section, a moving body-removed image by smoothing the plurality of the time-series input images for the background area, wherein the area classifying section classifies the input image from the imaging unit into the moving body area, the immediately after-moving body-passing-area and the background area, and wherein the selection combining section selects the input image from the imaging unit for the moving body area, selects the moving body-removed image generated by the moving body-removed image updating section for the immediately after-moving body-passing-area, selects the corrected image corrected by the image correction unit for the background area, and combines the selected input image, the selected moving body-removed image and the selected corrected image.

As an eighth configuration, in the image processing apparatus according to the seventh configuration, the image correction unit further includes:

a histogram analyzing section which calculates a difference between the plurality of the time-series input images from the imaging unit and a difference between the input image from the imaging unit and the temporally-smoothed image from the temporally-smoothed image generation section, and wherein the area classifying section performs the area classification based on the differences calculated by the histogram analyzing section.

As a ninth configuration, in the image processing apparatus according to any one of the first to eighth configurations, the temporally-smoothed image generation section generates the temporally-smoothed image using an exponential moving average, a weighted moving average or a simple moving average.

As a tenth configuration, in the image processing apparatus according to any one of the first to ninth configurations, the similarity determination section determines the similarity by block matching using the sum of absolute difference.

As an eleventh configuration, in the image processing apparatus according to any one of the first to tenth configurations, the corrected image generation section generates the corrected image by combining the selected partial areas of the plurality of the time-series input images in a non-overlapping manner.

As a twelfth configuration, in the image processing apparatus according to any one of the first to eleventh configurations, the image processing apparatus further includes an image display unit for displaying the corrected image generated by the corrected image generation section, wherein an image correction area, in which a real-time image correction is able to be performed, is displayed on the image display unit and the image correction area is able to be changed in size and shifted by a manipulation of an operator, wherein the similarity determination section determines the similarities only within the image correction area, wherein the corrected image generation section generates the corrected image only within the image correction area, and wherein the temporally-smoothed image generation section generates the temporally-smoothed image over the entire input image from the imaging unit, irrespective of the size of the image correction area.

INDUSTRIAL APPLICABILITY

The present disclosure can be applied to groups of products which perform image processing, such as cameras and so on.

REFERENCE NUMERALS

41 . . . imaging unit, 42 . . . shimmer correction unit (image correction unit), 43 . . . image display unit, 50 . . . temporally-smoothed image generation section, 51 . . . temporally-smoothed image holder, 52 . . . multiplier, 53 . . . multiplier, 54 . . . adder, 60 . . . similarity determination section, 61 . . . temporally-smoothed image holder, 62 . . . input image holder, 63 . . . BM calculation section, 64 . . . BM calculation result holder, 70 . . . corrected image generation section, 71 . . . optimal local area selection section, 72 . . . corrected image holder, 81 . . . input image memory, 82 . . . temporally-smoothed image memory, 82a . . . immediately after-moving body-passing-area, 82b . . . moving body area, 82c . . . moving body and passage area, 82d . . . background area, 83 . . . moving body-removed image memory, 84 . . . temporally-smoothed image updating unit, 85 . . . histogram analyzing unit, 86 . . . area classifying unit, 87 . . . shimmer correction unit, 88 . . . moving body-removed image updating unit, 89 . . . selection combining unit, 90 . . . shimmer distortion calculation unit, 91 . . . parameter optimization unit, 92 . . . output image, 100 . . . computer, 101 . . . external data, 106 . . . monitor output, 110 . . . main board, 111 . . . interface, 112 . . . CPU, 113 . . . memory, 114 . . . PCI controller, 120 . . . graphics board, 121 . . . PCI controller, 122 . . . GPU internal bus, 123 . . . GPU, 124 . . . core, 131 . . . shimmer image, 132 . . . shimmer correction area, 133 . . . cursor, 171 . . . reference image, 172 . . . input image.

What is claimed is:

1. An image processing apparatus comprising:
an imaging unit for outputting an imaging result as a time-series image; and
an image correction unit, to which the time-series image outputted from the imaging unit is inputted as an input image, for correcting image fluctuation in the input image,
wherein the image correction unit includes:
a temporally-smoothed image generation section which generates, based on a plurality of time-series input images from the imaging unit, a temporally-smoothed image by smoothing the plurality of the time-series input images;
a similarity determination section which sets a local area for the temporally-smoothed image generated by the temporally-smoothed image generation section and determines similarities between the local area in the temporally-smoothed image and partial areas of the plurality of the time-series input images; and
a corrected image generation section which selects, from the partial areas of the plurality of the time-series input images, a partial area of one of the plurality of the time-series input images having an image most similar to an image of the local area of the temporally-smoothed image based on a similarity determination result calculated by the similarity determination section, and generates a corrected image based on the selected partial area.

2. The image processing apparatus of claim 1, wherein the similarity determination section sets a plurality of local areas for the temporally-smoothed image and determines similarities between each of the plurality of the local areas in the temporally-smoothed image and the partial areas of the plurality of the time-series input images, and
wherein the corrected image generation section selects, from the partial areas of the plurality of the time-series input images, partial areas of the plurality of the time-series input images each of which has an image most similar to an image of one of the plurality of the local areas based on the similarity determination result calculated in the similarity determination section, and generates the corrected image based on the selected partial areas.

3. The image processing apparatus of claim 2, wherein the corrected image generation section smoothes the selected partial areas.

4. The image processing apparatus of claim 2, wherein the image correction unit further includes:
an area classifying section which classifies the input image from the imaging unit into a moving body and passage area composed of a moving body area and an immediately after-moving body-passing-area, and a background area other than the moving body and passage area; and
a selection combining section which selects the input image from the imaging unit for the moving body and passage area, selects the corrected image corrected by the image correction unit for the background area, and combines the selected input image and the selected corrected image.

5. The image processing apparatus of claim 4, wherein the image correction unit further includes:
a moving body-removed image updating section which generates, based on the plurality of the time-series input images from the imaging unit and an area classification result from the area classifying section, a moving body-removed image by smoothing the plurality of the time-series input images for the background area,
wherein the area classifying section classifies the input image from the imaging unit into the moving body area, the immediately after-moving body-passing-area and the background area, and
wherein the selection combining section selects the input image from the imaging unit for the moving body area, selects the moving body-removed image generated by the moving body-removed image updating section for the immediately after-moving body-passing-area, selects the corrected image corrected by the image correction unit for the background area, and combines the selected input image, the selected moving body-removed image and the selected corrected image.

6. The image processing apparatus of claim 5, wherein the image correction unit further includes:
a histogram analyzing section which calculates a difference between the plurality of the time-series input images from the imaging unit and a difference between the input image from the imaging unit and the temporally-smoothed image from the temporally-smoothed image generation section, and wherein the area classifying section performs the area classification based on the differences calculated by the histogram analyzing section.

7. The image processing apparatus of claim 2, wherein the corrected image generation section generates the corrected image by combining the selected partial areas of the plurality of the time-series input images in a non-overlapping manner.

8. The image processing apparatus of claim 1, wherein the similarity determination section sets a search range for searching the partial areas in the plurality of the time-series input images and determines similarities between the local area in the temporally-smoothed image and the plurality of the time-series input images within the search range.

9. The image processing apparatus of claim 8, wherein the similarity determination section sets the search range based on a motion vector in the local area.

10. The image processing apparatus of claim 1, wherein the temporally-smoothed image generation section generates the temporally-smoothed image by using an exponential moving average, a weighted moving average or a simple moving average.

11. The image processing apparatus of claim 1, wherein the similarity determination section determines the similarities by block matching using a sum of absolute difference.

12. The image processing apparatus of claim 1, further comprising an image display unit for displaying the corrected image generated by the corrected image generation section,
wherein an image correction area, in which a real-time image correction is able to be performed, is displayed on the image display unit and the image correction area is able to be changed in size and shifted by a manipulation of an operator,
wherein the similarity determination section determines the similarities only within the image correction area,
wherein the corrected image generation section generates the corrected image only within the image correction area, and
wherein the temporally-smoothed image generation section generates the temporally-smoothed image over the entire plurality of the time-series input images from the imaging unit, irrespective of the size of the image correction area.

\* \* \* \* \*